United States Patent
Xie et al.

(10) Patent No.: US 7,606,875 B2
(45) Date of Patent: Oct. 20, 2009

(54) DETECTING SERVING AREA OF A WEB RESOURCE

(75) Inventors: Xing Xie, Beijing (CN); Lee Wang, Kirkland, WA (US); Qi Zhang, Hefei (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/277,704

(22) Filed: Mar. 28, 2006

(65) Prior Publication Data
US 2007/0233864 A1 Oct. 4, 2007

(51) Int. Cl.
*G06F 15/16* (2006.01)
(52) U.S. Cl. .................................. 709/218; 709/224
(58) Field of Classification Search ................ 709/202, 709/219, 200, 203, 218, 224; 705/14, 1; 707/102; 455/456, 414.1; 715/733
See application file for complete search history.

(56) References Cited

U.S. PATENT DOCUMENTS

| | | | |
|---|---|---|---|
| 6,516,311 B1 | 2/2003 | Yacoby et al. | |
| 6,629,136 B1* | 9/2003 | Naidoo | 709/219 |
| 6,684,250 B2 | 1/2004 | Anderson et al. | |
| 6,731,612 B1* | 5/2004 | Koss | 370/310 |
| 6,885,860 B2* | 4/2005 | Bahl et al. | 455/414.1 |
| 6,973,438 B1 | 12/2005 | Philyaw | |
| 6,976,090 B2 | 12/2005 | Ben-Shaul et al. | |
| 7,158,780 B2* | 1/2007 | Bahl et al. | 455/414.1 |
| 7,257,570 B2 | 8/2007 | Riise et al. | |
| 7,257,577 B2 | 8/2007 | Fagin et al. | |
| 2002/0119788 A1* | 8/2002 | Parupudi et al. | 455/456 |
| 2002/0156779 A1 | 10/2002 | Elliott et al. | |
| 2003/0216930 A1* | 11/2003 | Dunham et al. | 705/1 |
| 2004/0083133 A1 | 4/2004 | Nicholas et al. | |
| 2004/0225562 A1* | 11/2004 | Turner | 705/14 |
| 2005/0021403 A1* | 1/2005 | Ozer et al. | 705/14 |
| 2005/0065916 A1 | 3/2005 | Ge et al. | |
| 2005/0065959 A1 | 3/2005 | Smith et al. | |
| 2005/0216547 A1* | 9/2005 | Foltz-Smith et al. | 709/200 |
| 2006/0059225 A1* | 3/2006 | Stonehocker et al. | 709/202 |
| 2006/0143266 A1* | 6/2006 | Ohto et al. | 709/203 |
| 2006/0212350 A1* | 9/2006 | Ellis et al. | 705/14 |
| 2006/0271531 A1 | 11/2006 | O'Clair et al. | |
| 2006/0282455 A1* | 12/2006 | Lee et al. | 707/102 |
| 2008/0052151 A1 | 2/2008 | Xie et al. | |
| 2008/0052413 A1 | 2/2008 | Wang et al. | |
| 2008/0134042 A1* | 6/2008 | Jankovich | 715/733 |

OTHER PUBLICATIONS

U.S. Appl. No. 11/081,014, filed Mar. 2005, Wang et al.
"City-Data.Com," http://www.city-data.com [last accessed Feb. 23, 2007].
"Geographic Names Information System (GNIS)," http://geonames.usgs.gov/, [last accessed Feb. 23, 2007].
"Google Local Search," http://www.google.com/local, [last accessed Feb. 23, 2007].

(Continued)

*Primary Examiner*—Jungwon Chang
(74) *Attorney, Agent, or Firm*—Perkins Coie LLP

(57) ABSTRACT

Methods and systems for determining the serving area of a web resource by address, by query content, and by business category are provided. A location system may determine the serving area of a web resource based on addresses of users who access the web resource. The location system may determine the serving area for a web site (or other web resource) based on query terms that resulted in a click-through to the web site. The location system may determine the serving area of a web site (or other web resource) based on the business category of the web site and a "provider location" associated with the web site.

19 Claims, 18 Drawing Sheets

OTHER PUBLICATIONS

"MSN Local Search and Microsoft MapPoint," http://mappoint.msn.com, [last accessed Feb. 23, 2006].
"North American Numbering Plan," http://sd.wareonearth.com/~phil/npanxx, [last accessed Feb. 23, 2007].
"Open Directory Project," http://dmoz.org/, [last accessed Feb. 23, 2007].
"Spirit project," http://www.geo-spirit.org, [last accessed Feb. 23, 2006].
"USPS—The United States Postal Services," http://www.usps.com, [last accessed Feb. 23, 2007].
"Yahoo Directory," http://dir.yahoo.com/, [last accessed Feb. 13, 2007].
"Yahoo Local," http://local.yahoo.com, [last accessed Feb. 26, 2007].
"Yahoo Regional," http://www.yahoo.com/regional, [last accessed Feb. 13, 2007].
Amitay, Einat et al., "Web-a-where: Geotagging Web Content," SIGIR'04, Sheffield, South Yorkshire, UK, © 2004 ACM, pp. 273-280.
Beckmann, Norbert et al., "The R-tree: An Efficient and Robust Access Method for Points and Rectangles," Proceedings of the 1990 ACM SIGMOD International Conference on Management of Data, Atlantic City, New Jersey, © 1990 ACM, pp. 322-331.
Brin, Sergey and Lawrence Page, "The Anatomy of a Large-Scale Hypertextual Web Search Engine," 7th WWW, Apr. 1998, 20 pages.
Burges, Christopher J.C., "A Tutorial on Support Vector Machines for Pattern Recognition," Data Mining and Knowledge Discovery, 2, 1998, © 1998 Kluwer Academic Publishers, pp. 121-167.
Buyukkokten, Orkut et al., "Exploiting Geographical Location Information of Web Pages," Proceedings of the ACM SIGMOD Workshop on the web and Databases, Jun. 1999. pp. 91-96.
Chakrabarti, Soumen et al., "Enhanced hypertext categorization using hyperlinks," ACM SIGMOD 1998, Seattle, Washington, 12 pages.
Davison, Brian D., "Topical Locality in the Web: Experiments and Observations," Jul. 2000, Technical Report DCS-TR-414, Department of Computer Science, Rutgers University, pp. 1-22.
Ding, Junyan et al., "Computing Geographical Scopes of Web Resources," Proceedings of the 26th VLDB Conference, Cairo, Egypt, 2000, pp. 545-556.
Dumais, Susan and Hao Chen, "Hierarchical Classification of Web Content," SIGIR 2000, Athens, Greece, © 2000 ACM, pp. 256-263.
Glover, Eric J. et al., "Using Web Structure for Classifying and Describing Web Pages," WWW2002, May 2002, Honolulu, Hawaii, ACM, pp. 562-569.
Gravano, Luis et al., "Categorizing Web Queries According to Geographical Locality," CIKM'03, Nov. 2003, New Orleans, Louisiana, © 2003 ACM, 9 pages.
Gravano, Luis, "GeoSearch: A Geographically-Aware Search Engine," http://geosearch.cs.columbia.edu, [last accessed Feb. 23, 2007].
Guttman, Antonin, "R-Trees: A Dynamic Index Structure For Spatial Searching," © 1984 ACM, pp. 47-57.
Hearst, Marti A., "Trends & Controversies—Support vector machines," IEEE Intelligent Systems, Jul./Aug. 1998, pp. 18-28.
Hill, Linda L. et al., "Geographic Names," D-Lib Magazine, Jan. 1999, vol. 5, Issue 1, 17 pages.
Jones, Matt et al., "Using a Mobile Device to Vary the Pace of Search," Human-Computer Interaction with Mobile Devices and Services, Mobile HCI 2003, Udine, Italy, 2003, © Springer-Verlag Berlin Heidelberg 2003, pp. 390-394.
Kaasinen, Eija, "User needs for location-aware mobile services," Pers Ubiquit Comput, 2003, vol. 7, © Springer-Verlag London Limited 2003, pp. 70-79.
Kosala, Raymond and Hendrik Blockeel, "Web Mining Research: A Survey," SIGKDD Explorations, Jul. 2000, vol. 2, Issue 1, © 2000 ACM SIGKDD, pp. 1-15.
Larson, Ray R., "Geographic Information Retrieval and Spatial Browsing," in GIS and Libraries: Patrons, Maps and Spatial Information, Linda Smith and Myke Gluck, Eds., University of Illinois, 1996, pp. 81-124, available online at http://sherlock.berkeley.edu/geo_ir/PART1.html.
Lee, Fiona et al., "Global Atlas: Calibrating and Indexing Documents from the Internet in the Cartographic Paradigm," 1st International Conference on Web Information Systems Engineering, IEEE Computer Society 2000, Hong Kong, China, © 2000 IEEE, pp. 125-132.
Lee, R. et al., "Optimization of Geographic Area to a Web Page for Two-Dimensional Range Query Processing," 4th International Conference on Web Information Systems Engineering Workshops, Roma, Italy, 2003, © 2004 IEEE, pp. 9-17.
Leutenegger, Scott T. et al., "STR: A Simple and Efficient Algorithm for R-Tree Packing," 13th International Conference on Data Engineering, IEEE Computer Society 1997, Birmingham U.K., pp. 497-506.
Ma, Qiang and Katsumi Tanaka, "Retrieving Regional Information from Web by Contents Localness and User Location," AIRS 2004, LNCS 3411, 2005, © Springer-Verlag Berlin Heidelberg 2005, pp. 301-312.
Ma, Qiang et al., "A Localness-Filter for Searched Web Pages," APWeb 2003, LNCS 2642, © Springer-Verlag Berlin Heidelberg 2003, pp. 525-536.
Markowetz, Alexander et al., "Design and Implementation of a Geographic Search Engine," 8th International Workshop on the Web and Databases, Jun. 2005, Baltimore, Maryland, 6 pages.
Mccurley, Kevin S., "Geospatial Mapping and Navigation of the Web," WWW10, May 2001, Hong Kong, ACM, pp. 221-229.
Platt, John C., "Fast Training of Support Vector Machines using Sequential Minimal Optimization," Chapter 12, Advances in Kernel Methods—Support Vector Learning, B. Schölkopf, C. Burges, and A. Smola, eds., MIT Press, 1999, pp. 185-208.
Pramudiono, Iko et al., "User Behavior Analysis of Location Aware Search Engine," 3rd International Conference on Mobile Data Management, Singapore, Jan. 2002, 7 pages.
Sanderson, Mark and Janet Kohler, "Analyzing geographic queries," In Proceedings of SIGIR 2004, Workshop on Geographic Information Retrieval, ACM Press, Sheffield, UK, 2004, 2 pages.
Song, Ruihua et al., "Learning Block Importance Models for Web Pages," WWW 2004, May, New York, ACM, 9 pages.
Sterling, Greg, "Search Engine Watch—Local Search: The Hybrid Future," Jan. 8, 2004, http://searchenginewatch.com/searchday/article.php/3296721, [last accessed Feb. 23, 2007].
Theodoridis, Yannis et al., "Efficient Cost Models for Spatial Queries Using R-Trees," IEEE Transactions on Knowledge and Data Engineering, vol. 12, No. 1, Jan./Feb. 2000, © 2000 IEEE, pp. 19-32.
Vaid, Subodh and Christopher B. Jones, "Spatially Indexing Text Documents," Report on Spatial Indexing Methods, Technical Report D12 2201, SPIRIT project, 2004, 37 pages.
Wang, Chuang et al., "Detecting Geographic Locations from Web Resources," GIR'05, Nov. 2005, Bremen, Germany, © 2005 ACM, pp. 17-24.
Wang, Chuang et al., "Web Resource Geographic Location Classification and Detection," WWW 2005, May 2005, Chiba, Japan, ACM, pp. 1138-1139.
Wang, Lee et al., "Detecting Dominant Locations from Search Queries," SIGIR'05, Aug. 2005, Salvador, Brazil, © 2005 ACM, 8 pages.
Yang, Yiming et al., "A Study of Approaches to Hypertext Categorization," Journal of Intelligent Information Systems, © Kluwer Academic Publishers, Boston, pp. 1-25.
Yokoji, Seiji et al., "Kokono Search: A Location Based Search Engine," WWW 10, Hong Kong, May 2001, 2 pages.
PCT International Search Report and Written Opinion; International Patent Application No. PCT/US2007/005393; Applicant: Microsoft Corporation; Mailed on Aug. 29, 2007; 4 pages.
PCT International Search Report and Written Opinion; International Patent Application No. PCT/US2007/076909; Applicant: Microsoft Corporation; Mailed on Jan. 31, 2008; 3 pages.

* cited by examiner

DETECTING SERVING AREA OF A WEB RESOURCE

BACKGROUND

Web resources such as web pages and web sites have geographic serving areas associated with them. A serving area represents the geographic distribution of users who are interested in the web resource. A serving area, alternatively, may be considered to represent the geographic area that the web resource intends to reach. For example, a web page that lists houses for sale within a city may have a serving area of the county that contains the city. As another example, a web page with general information, such as an introduction to mathematics, is likely of interest to users from any location and thus has a serving area of the entire world.

Many location-based web applications have been developed to support mobile devices and local searching needs. Such location-based web applications include navigation systems, location-based search systems, local advertisement systems, geographic retrieval systems, and so on. These web applications typically need to detect the serving area of a web resource and match it with the user's current location. For example, a cellular phone user may want to find a local car dealership. A web application could match the user's current location as indicated by the cellular phone with the serving area of car dealers to identify which car dealerships may be appropriate to suggest to the user.

Typically, web applications search web resources for location information (e.g., city names) and use that information when determining whether the web resource matches the user's location. A difficulty with such web applications is that location information of a web resource may have different purposes and thus different meanings. For example, a web page for a Chinese restaurant may contain the geographic locations "Peking" and "Redmond." The geographic location of Peking indicates that the subject of the web page is somehow related to China, but the geographic location of Redmond indicates that the restaurant is located in Redmond, Wash., USA. If a web application is trying to match the user's current location, which may be in Beijing, to the location of the web page, the web application might erroneously determine that the serving area is Beijing. In such a case, the web application might suggest a restaurant in Redmond, Wash. to a user in Beijing.

SUMMARY

Methods and systems for determining the serving area of a web resource by address, by query content, and by business category are provided. A location system may determine the serving area of a web resource based on addresses of users who access the web resource. The location system may identify the accesses to a web resource by analyzing web access information such as web access logs, click-through logs, and so on. The location system retrieves the addresses from the web access information and then determines the geographic locations associated with the addresses. After the location system identifies the locations of each user access to the web site, it analyzes the identified locations to determine the serving area of the web resource. The location system may use a hierarchy of locations such as one organized by continent, country, state, and city. The location system may select locations for the serving area based on the number of accesses of the web resource by users within the location and based on a distribution of the number of accesses of the web resource by users within locations that are hierarchically within the location.

The location system may determine the serving area for a web site (or other web resource) based on query terms that resulted in a click-through to the web site. The location system analyzes the queries that resulted in a click-through to identify "location terms" within the query. A "location term" in some way identifies a location. The location system then generates a document that contains the locations represented by the identified location terms. The location system then applies a content location detection algorithm to the generated document to identify the "content location" of the document, which the location system uses to represent the serving area.

The location system may determine the serving area of a web site (or other web resource) based on the business category of the web site and a "provider location" associated with the web site. The location system may determine the category of a web site by providing the content of the web site to a classifier that has been trained to classify a web site by business category based upon its content. The location system defines a scope for each business category that indicates the typical size of the serving area for web sites within that business category. To determine the serving area for a web site, the location system analyzes the web site to identify the provider location. The location system then represents the serving area for the web site as the scope associated with the identified provider location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is a block diagram that illustrates the processing of the compute weights component of the content location components in one embodiment.

FIG. 10 is a flow diagram that illustrates the processing of the compute geographic location weight component of the content location components in one embodiment.

FIG. 11 is a flow diagram that illustrates the processing of the compute power component of the content location components in one embodiment.

FIG. 12 is a flow diagram that illustrates the processing of the compute contribution of descendants component of the content location components in one embodiment.

FIG. 13 is a flow diagram that illustrates the processing of the compute contribution of ancestors component of the content location components in one embodiment.

FIG. 14 is a flow diagram that illustrates the processing of the compute spread component of the content location components in one embodiment.

FIG. 15 is a flow diagram that illustrates the processing of the traverse component of the content location components in one embodiment.

FIG. 18 is a flow diagram that illustrates the processing of the extract location string and feature component of the provider location components in one embodiment.

DETAILED DESCRIPTION

Figure 1:
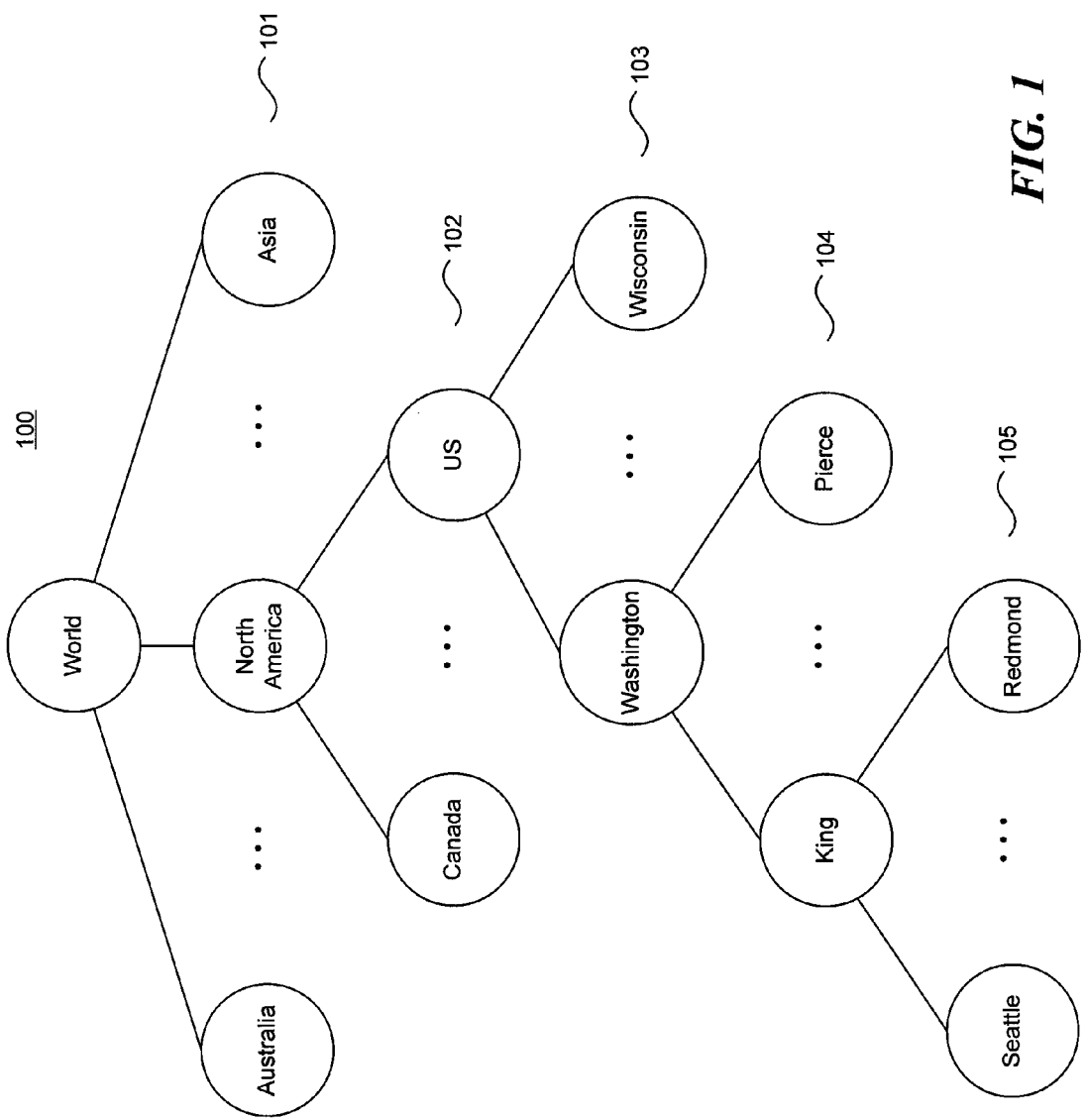
FIG. 1 is a diagram that illustrates a location hierarchy in one embodiment.

Methods and systems for determining the serving area of a web resource are provided. In one embodiment, a location system determines the serving area of a web resource (e.g., web site or ftp server) based on addresses (e.g., IP addresses) of users who access the web resource. The location system may identify the accesses to a web resource by analyzing web access information such as web access logs, click-through logs, and so on. A web access log may be generated by a web site and may contain an entry for each access by a user to the web site. Each entry may include the IP address of the user. A click-through log may be generated by a search engine and may contain an entry for each selection of a reference to the web site that is included in a query result, commonly referred to as a "click-through." The location system retrieves the IP addresses from the web access information and then determines the geographic locations associated with the IP addresses. Many commercial products are available that provide mappings from IP addresses to geographic locations, such as IP2 Location by Hexasoft Development and GeoPoint by Quova Corp. After the location system identifies the locations of each user access to the web site, it analyzes the identified locations to determine the serving area of the web resource. The location system may use a hierarchy of locations such as one organized by continent, country, state, and city. The location system may select locations for the serving area based on the number of accesses of the web resource by users within the location and based on a distribution of the number of accesses of the web resource by users within locations that are hierarchically within the location. For example, if 90% of the accesses to a web site are by users in King County in Washington State, then King County is a possible serving area for the web site. If, however, 95% of those accesses are by users in the city of Seattle, then Seattle may be a more appropriate serving area. Since only 5% of the accesses by users in King County are by users outside of Seattle, a serving area of Seattle, rather than King County, more precisely describes the serving area. If, however, the number of accesses by users in King County are distributed equally among the cities within the county (adjusted for differences in city population), then King County may indeed be an appropriate serving area for the web site. In this way, the location system can identify accurate serving areas for web resources.

In one embodiment, the location system determines the serving area for a web site (or other web resource) based on query terms that resulted in a click-through to the web site. The location system analyzes the queries that resulted in a click-through to identify "location terms" within the query. A "location term" in some way identifies a location. For example, the query "Lombardi's pizza New York City" contains the location term "New York City," and the query "pizza nyc" contains the location term "nyc," which represents the location "New York City." The location system then generates a document that contains the locations represented by the identified location terms. For example, the document may contain 20 occurrences of the location of New York City corresponding to 13 occurrences of the location term "New York City," 4 occurrences of the location term "New York," and 3 occurrences of the location term "nyc" in the queries. The location system then applies a content location detection algorithm to the generated document to identify the "content location" of the document, which the location system uses to represent the serving area. A content location identifies the geographic location that is the subject of a document. For example, a web page about the Great Wall of China would have "China" as a content location because the subject of the web page is China. Because the location system generates the document from location terms of click-through logs for a web site, the content location of the document may accurately identify the serving area of the web site.

In one embodiment, the location system determines the serving area of a web site (or other web resource) based on the business category of the web site and a "provider location" associated with the web site. The location system may determine the category of a web site by providing the content of the web site to a classifier that has been trained to classify a web site by business category based upon its content. For example, the business categories may include banking services, transportation services, restaurants, and so on. The location system defines a scope for each business category that indicates the typical size of the serving area for web sites within that business category. For example, a web site for banking services or a restaurant may provide services to users that are typically within the same city. A web site for an airport, in contrast, may provide services to users in a broader area, such as within the same state. A web site for a software development company may provide services to users in a yet broader area, such as within the same country. Thus, the location system may represent the scope as a city, state, or country. Alternatively, the location system may represent scope by a radius (e.g., 10 miles for a restaurant and 100 miles for an airport). To determine the serving area for a web site, the location system analyzes the web site to identify the provider location. A provider location identifies the geographic location of the entity (e.g., organization, corporation, or person) that provides the web resource. The provider location usually is a sequential address string including street address, city name, state name, zip code, country, and so on. For example, the provider location of a web site provided by a certain company may be the address of the corporate headquarters of the company. The location system then represents the serving area for the web site as the scope associated with the identified provider location. For example, if the web site has the business category of airport and the provider location is Seattle, then since the scope of the airport business category is state and Seattle is located in Washington State, the serving area of the web site is Washington State.

In one embodiment, the location system determines the serving area of a web site based on addresses of the users who access the web site and based on the number of accesses associated with the each location (identified from the IP address). The location system may use a weight metric and a spread metric to identify the appropriate location for the serving area. A location that has a high weight and a high spread may accurately represent the serving area. The weight metric measures the percentage of users in a certain location (e.g., Seattle) who are interested in a web site relative to the parent location (e.g., King County). In the example given above, if 95% of the accesses to a web site by users in King County are by users in Seattle, then the weight for Seattle should be high relative to the weight of King County. The location system may calculate the weight for location based on the ratio of the access rates of users within the location to the access rates of users within the parent location. For example, if the access rate for a city is 95% and the access rate for the county that contains the city is 90%, then the weight for the city may 1.06 (i.e., 95% divided by 90%). If the access rate for another city is instead 9%, then the weight for the city may be 0.1 (i.e., 9% divided by 90%). The location system may represent the weight as follows:

$$\text{Weight}(w, l) = \frac{\text{Click}(w, l)/\text{Population}(l)}{\text{Click}(w, \text{Parent}(l))/\text{Population}(\text{Parent}(l))} \quad (1)$$

where Weight(w,l) represents the weight of location l for web resource w, Click(w,l) represents the number of click-throughs from location l to website w, Population(l) represents the population of location l, and Parent(l) represents the parent location of location l. The population of a location may be the actual number of people who live within that location, the number of web users who live within that location, and so on.

The spread metric measures the distribution of weights among the child locations in a certain location. A parent location that has child locations with uniform weights is likely a more accurate representation of the serving area than any of its child locations. In contrast, a child location that has a weight that is much higher than any of its sibling locations is likely a more accurate representation of the serving area than its parent location. The location system may represent the spread of a location as follows:

$$\text{Spread}(w, l) = \frac{-\sum_{i=1}^{n} \frac{\text{Weight}(w, l_i)}{\sum_{j=1}^{n} \text{Weight}(w, l_j)} \times \log\left(\frac{\text{Weight}(w, l_i)}{\sum_{j=1}^{n} \text{Weight}(w, l_j)}\right)}{\log n} \quad (2)$$

where Spread(w,l) represents the spread of location l for web resource w, Weight(w,l) represents the weight of location l for web resource w, $l_x$ represents a child location x of location l, and n represents the number of child locations of location l.

The location system identifies the locations that represent the serving area by traversing the location hierarchy in a top-down manner. As the location system visits a location in the location hierarchy, the location system determines the weight and the spread for the location. If the weight of a location is greater than a threshold weight, then the location is a potential serving area. If the spread of the location is low, then the location system assumes one of the child locations would be a better representation of the serving area and visits the child locations. If, however, the spread of the location is high (i.e., meaning that the weights of the child locations are uniformly distributed), then the location system marks the location as the serving area. When the traversal completes, the marked locations represent the serving area.

In one embodiment, the location system identifies the serving area of a web site based on analysis of location terms within a search or query log. After extracting the location terms from the queries that resulted in a click-through to the web site, the location system replaces location terms with their aliases (e.g., "nyc" with "New York City"). The location system may also disambiguate the location terms that are ambiguous (e.g., replacing "ny" with "New York," rather than with "New York City"). The location system then generates a location term document that contains the location terms and then identifies a content location for the generated document using a content location detection algorithm. The location system identifies the content location using a geographic hierarchy of locations, assigning weights to each location indicating whether the location is likely the subject of the web site, and calculating a power and spread for each location. After the power and spread for each location are calculated, the location system then identifies those locations whose power meets a threshold power and whose spread meets a threshold spread as content locations. The power is a measure of the relatedness of a location to the web site, and the spread is a measure of the uniformity of the power among sibling locations of the geographic hierarchy. The location system may represent power by the following equation:

$$\text{Power}(w, l) = Wt(w, l) + \sum_{j=1}^{n} Wt(w, \text{Child}_j(l)) + \sum_{i=1}^{m} \frac{Wt(w, \text{Ancestor}_i(l))}{|\text{Sibling}_i(l)|} \quad (3)$$

where Power(w,l) is the power of web resource w at location l in the geographic hierarchy, Wt(w,l) is the weight of location l for web resource w, $\text{Child}_j(l)$ is a descendant location l, n is the number of all descendant locations of location l, $\text{Ancestor}_i(l)$ is an ancestor location of location l, m is the number of all ancestor locations of location l, and $|\text{Sibling}_i(l)|$ is the number of locations at the same level with location l within the subtree with $\text{Ancestor}_i(l)$ as the root. This equation for power considers weights of both ancestor and descendant locations in addition to the weight of the current location. The location system may traverse the location hierarchy in a bottom-up manner to sum the weights of the descendant locations. The location system may also traverse the location hierarchy in a top-down manner to sum the weights of the ancestor locations. In this equation, the power of a location includes the power of the ancestor locations equally divided among sibling locations. One skilled in the art will appreciate that more complex strategies could be used to distribute the power of ancestor locations that would consider the geographic area or population density of the sibling locations.

In one embodiment, the location system when identifying the content location calculates the weight of the locations based on location terms that are extracted from the queries and included in the generation location document. For example, the location terms may include geographic names (e.g., Redmond), postal codes (e.g., 98052), telephone numbers (e.g., 425-555-5555), and so on. The location system may assign a higher weight to postal codes and telephone numbers because they may be a more accurate indicator of content location than a geographic name. For example, some geographic names may ambiguously refer to different geographic locations, for example, "Washington" may refer to Washington State or Washington, D.C. Also, some geographic names may ambiguously refer to geographic locations and persons, for example, "Washington" may refer to George Washington or Washington State. The location system may define the weight of the location by the following equation:

$$Wt(gk) = \begin{cases} Wt(zt) & \text{when } gk \text{ is Zip or telephone number} \\ (1 - Wt(zt)) \times \left(\frac{ldf(gn)}{idf(gn)}\right) & \text{when } gk \text{ is geographic name} \end{cases} \quad (4)$$

where Wt(gk) represents the weights of the geographic location term gk, Wt(zt) represents the common weight of zip code and telephone number, ldf(gn) is the document frequency of each geographic name (gn) as a geographic location term, and idf(gn) is the document frequency of gn as a general term. Due to the high reliability of zip codes and telephone numbers in correctly identifying unique geographic locations, the location system does not distinguish them and uses the same constant Wt(zt) (e.g., being greater than zero but less than one) to represent their common weight. The location system assigns weights of all geographic names subject to a common factor of (1−Wt(zt)). The location system uses Wt(zt) to control the balance of weights between zip codes/telephone numbers and geographic names. The weight of each individual geographic name is adjusted by ldf(gn)/idf(gn). The value for ldf(gn) and idf(gn) are calculated from two corpuses. One is a geographic relevant document corpus, where the location system assumes that each reference of gn is from a geographic perspective and ldf(gn) represents the referred frequency of each geographic name. The other is a general document corpus that is used to compute idf(gn). The underlying reasoning of weighting each geographic name by the ratio of ldf(gn) to idf(gn) comes from the observation that a geographic name will be more likely to be truly about a geographic location if it is more frequently referred to in the geographic corpus than in the general corpus.

After the weight for each location term is calculated, the location system then calculates the weight of each location by summing up the weights of the location terms that are aliases for that location term. For example, the location of Redmond may have aliases of Redmond, zip code 98052, and area code 425. The location system represents the weight of a location by the following equation:

$$Wt(w, l) = \sum_{gk} rf(w, gk) \times Wt(gk) \quad (5)$$

where Wt(w,l) represents the weight of location l for web resource w, gk (i.e., geographic keyword) represents any possible representations or aliases of location l, rf(w, gk) represents the referred frequency of gk in web resource w, and Wt(gk) is the weight of gk.

In one embodiment, the location system defines the spread of a location for purposes of identifying content location by the following equation:

$$Spread(w, l) = \frac{-\sum_{i=1}^{n} \frac{Power(w, l_i)}{\sum_{j=1}^{n} Power(w, l_j)} \times \log\left(\frac{Power(w, l_i)}{\sum_{j=1}^{n} Power(w, l_j)}\right)}{\log n} \quad (6)$$

where Spread (w,l) is the spread for location l of web resource w, location $l_i$ or location $l_j$ is a direct descendant location of location l, and n is the number of all direct descendants of l. After the Power and Spread are calculated for the locations, the location system identifies the content locations by traversing the location hierarchy in a top-down manner starting with the root location. The location system prunes any subtree when the Spread or Power ratio (i.e., power(location)/power (parent location)) of its root location does not exceed a given threshold Ts or Tp, respectively. When the traversal completes, the locations remaining in the geographic hierarchy represent the content location.

In one embodiment, the location system identifies the serving area of a web site based on the business category of the web site and the provider location associated with the web site. The location system may be provided with the business categories, which may have been specified manually by a user. The location system may identify the scope of each business category by analyzing click-through data or by using a scope provided by user. The location system may train a classifier to classify web sites according to business category. The location system trains the classifier using training data that includes web sites and their corresponding business categories. The location system may use a support vector machine ("SVM") based classifier. A support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to, but not identical to, the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

In one embodiment, the location system identifies the provider location by identifying potential provider locations and then using a classifier to classify a potential provider location as being or not being a provider location. The location system may initially train a classifier by generating training data that includes potential provider locations, associated features of the web resource as a feature vector, and a classification. The training data may be derived from a corpus of web resources. For example, the location system may extract strings from a web resource that are potentially provider locations. For example, the location system may look for street addresses, city names, state names, zip codes, and countries within the web resource. The location system then extracts features of the web resource that may indicate whether or not the extracted string is a provider location. The extracted features may include URL, title, anchor text, page content, referred frequency, level of web page within a web site, and spatial position of the extracted string on a web page. Some terms (e.g., "about us" and "contact us") in a title, URL, or anchor text can be a hint that the web page contains provider location.

The referred frequency indicates the number of times that a location is referenced within a web site. Since the address of a provider is typically provided on multiple web pages of a web site, a high referred frequency may tend to indicate that the extracted string is a provider location. Also, since provider locations are typically provided on the first level or second level web pages of a web site, the level of the web page from which the location string is extracted may indicate whether the extracted location string is a provider location. Since provider locations are often placed in footers of a web page, the placement of a location string within a web page may be used to help identify whether the location string is a provider location.

FIG. 1 is a diagram that illustrates a location hierarchy in one embodiment. The location hierarchy 100 includes a continent level 101, a country level 102, a state level 103, a county level 104, and a city level 105. One skilled in the art would appreciate that many different types of levels may be used; for example, a country may be divided into regions such as North, South, East, and West. In this example, Washington State has ancestor locations of North America and United States and has the descendant locations of King and Pierce counties and Seattle and Redmond cities. King and Pierce counties are direct descendants (or children) locations of their direct ancestor (or parent) location Washington State and are sibling locations.

Figure 2:
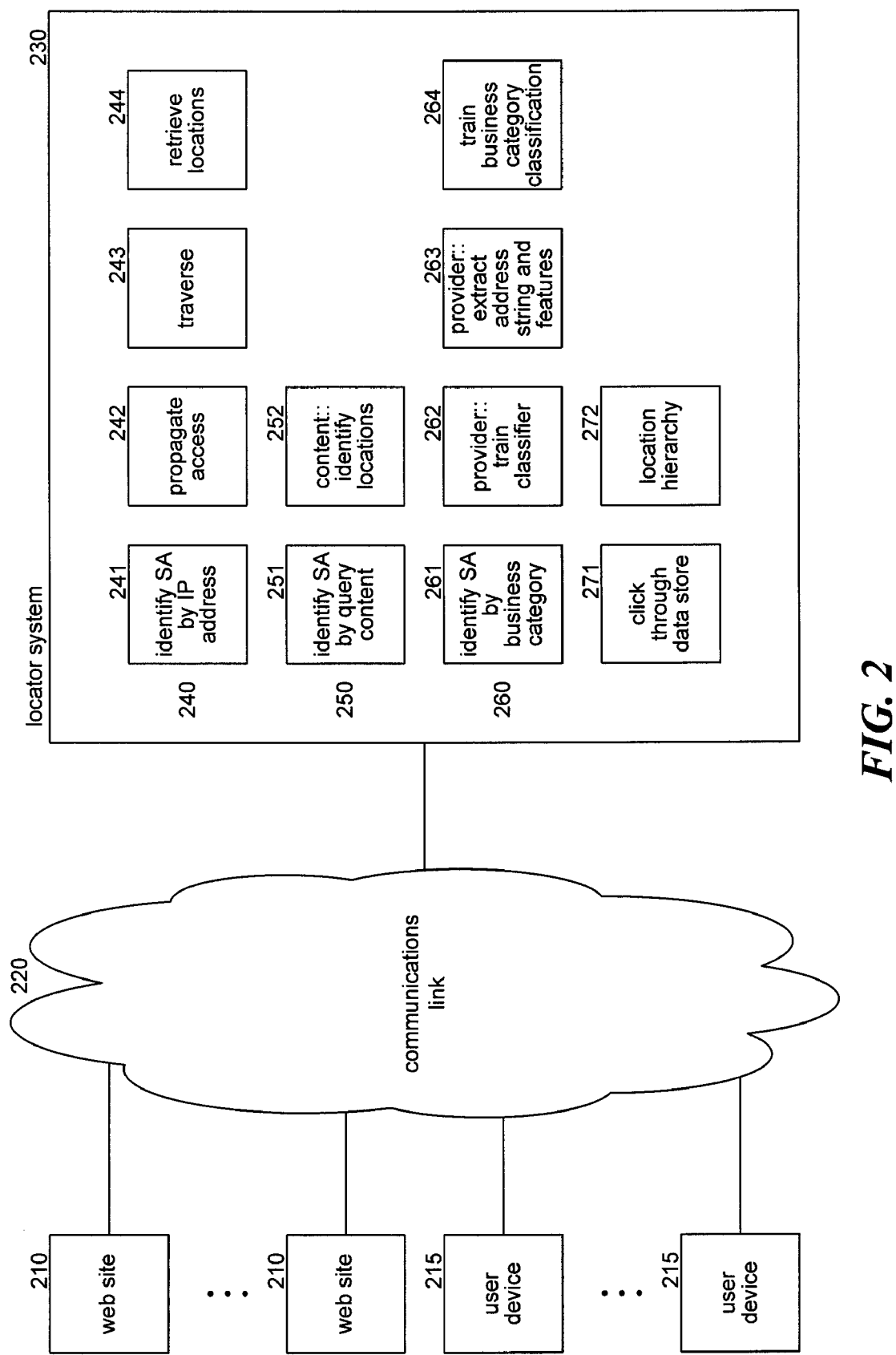
FIG. 2 is a block diagram that illustrates components of the location system in one embodiment.

FIG. 2 is a block diagram that illustrates components of the location system in one embodiment. The location system 230 is connected to web sites 210 and user devices 215 via communications link 220. The location system includes address components 240, query content components 250, and business category components 260. The address components include an identify serving area by IP address component 241, a propagate access component 242, a traverse component 243, and a retrieve locations component 244. The identify serving area by IP address component invokes the propagate access component, the traverse component, and the retrieve locations component to identify the serving area for web site. The query content components include an identify serving area by query content component 251 and an identify locations component 252. The identify serving area by query content component identifies the location terms, disambiguates the location terms, and invokes the identify locations component to identify content locations. The business category components include an identify serving area by business category component 261, a train classifier component 262, an extract address string and features component 263, and a train business category classifier component 264. The identify serving area by business category component determines the business category of the web site, determines the provider location from the web pages of the web site, and sets the serving area based on the scope of the business category and provider location. The train classifier component is used to train a classifier to identify the provider location of a web page. The extract address string and features component generates a feature vector for the web pages that is input to the classifier. The train business category classifier component trains a classifier to classify web sites according to business category. The location system also includes a click-through data store 271 and a location hierarchy data store 272.

The computing device on which the location system is implemented may include a central processing unit, memory, input devices (e.g., keyboard and pointing devices), output devices (e.g., display devices), and storage devices (e.g., disk drives). The memory and storage devices are computer-readable media that may contain instructions that implement the location system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the location system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The location system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
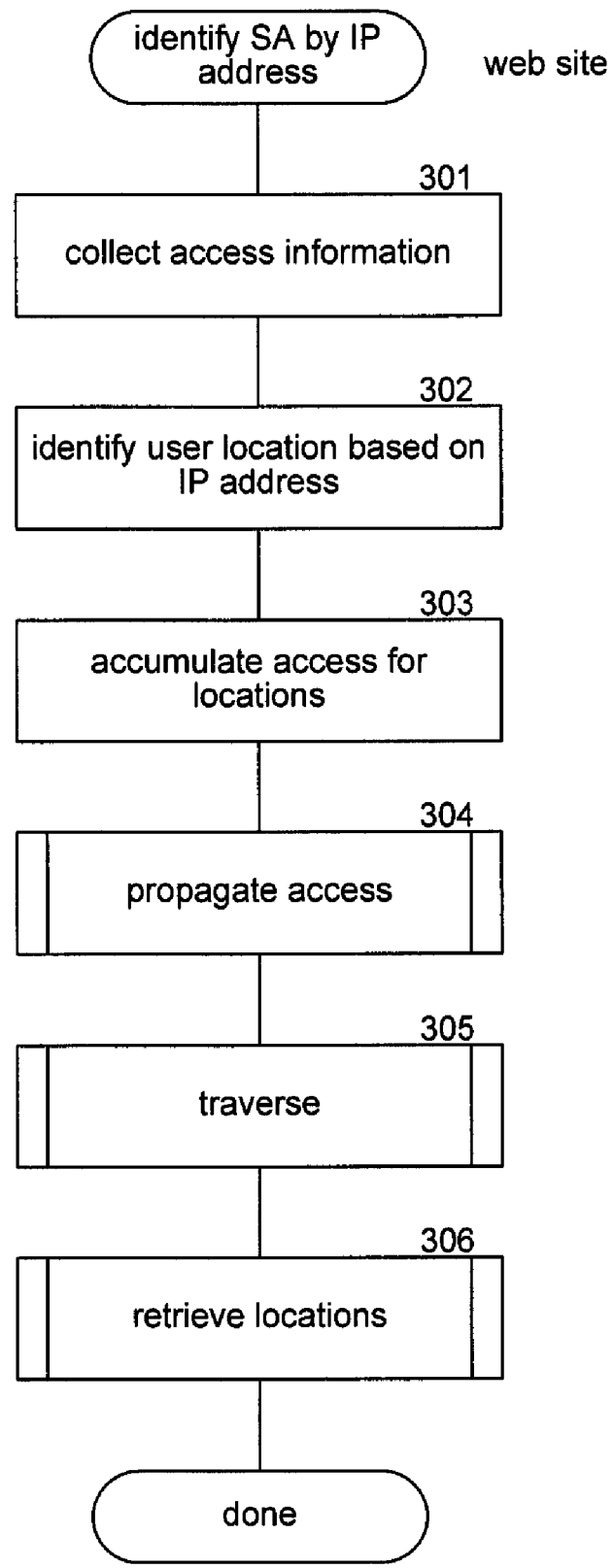
FIG. 3 is a flow diagram that illustrates the processing of the identify serving area by IP address component of the location system in one embodiment.

FIG. 3 is a flow diagram that illustrates the processing of the identify serving area by IP address component of the location system in one embodiment. The component is passed a web site and identifies its serving area based on the IP addresses of users who accessed the web site. In block 301, the component collects access information indicating the IP addresses of users who accessed the web site. In block 302, the component identifies the geographic location associated with each IP address. In block 303, the component determines the count of the accesses for each location. In block 304, the component invokes the propagate access component to propagate the count of the accesses up the location hierarchy. In block 305, the component invokes the traverse component to traverse the location hierarchy identifying locations that have sufficient weight and spread. In block 306, the component invokes the retrieve locations component to retrieve the leaf locations that have sufficient weight and spread. The component uses the retrieved locations as the serving areas and then completes.

Figure 4:
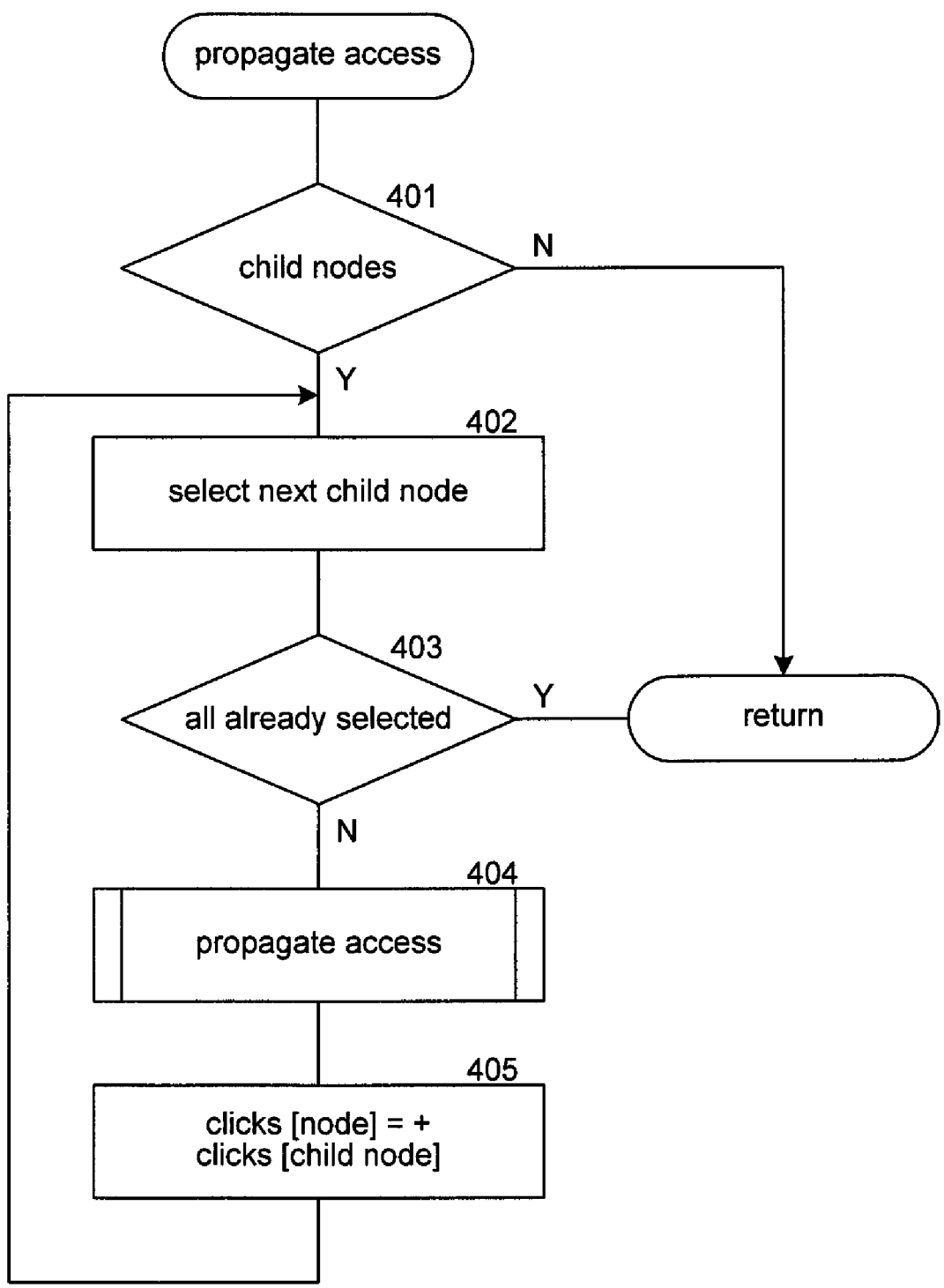
FIG. 4 is a flow diagram that illustrates the processing of the propagate access component of the location system in one embodiment.

FIG. 4 is a flow diagram that illustrates the processing of the propagate access component of the location system in one embodiment. The component recursively invokes itself to propagate the count of accesses from the leaf locations of the location hierarchy to the root location. The component is passed a location node starting with the root node. In decision block 401, if the passed node has child nodes, then the component continues at block 402, else the component is at a leaf node and returns. In blocks 402-405, the component loops selecting each child node of the passed node and recursively invoking the propagate access component to traverse the location hierarchy in a depth-first manner. In block 402, the component selects the next child node of the passed node. In decision block 403, if all the child nodes have already been selected, then the component returns, else the component continues at block 404. In block 404, the component recursively invokes the propagate access component. In block 405, the component accumulates the access counts of the selected child node into the access counts of the passed node. The component then loops to block 402 to select the next child node.

Figure 5:
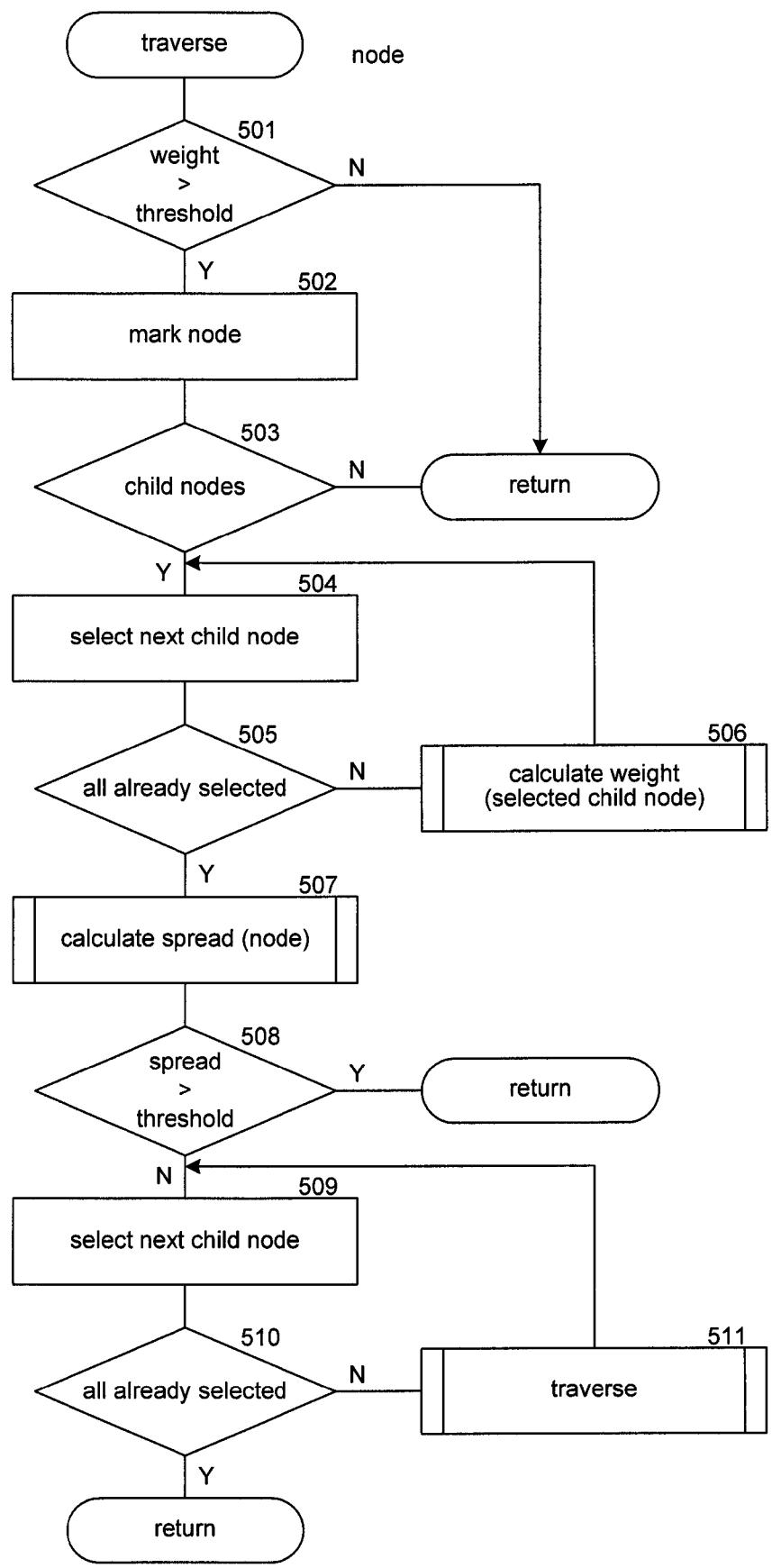
FIG. 5 is a flow diagram that illustrates the processing of the traverse component of the location system in one embodiment.

FIG. 5 is a flow diagram that illustrates the processing of the traverse component of the location system in one embodiment. The component is passed a node and traverses the location hierarchy from that node in a depth-first manner. The component searches for nodes representing locations with a sufficient weight and sufficient spread by recursively invoking itself. In decision block 501, if the passed node has a weight that is greater than a weight threshold, then the component continues at block 502, else the component prunes the subtree represented by the passed node by returning. In block 502, the component marks the passed node as having sufficient weight. In decision block 503, if the passed node has child nodes, then the component continues at block 504, else the passed node represents a leaf node with sufficient weight to represent the serving area and the component returns. In blocks 504-506, the component loops calculating the weight of each child node. In block 504, the component selects the next child node of the passed node. In decision block 505, if all the child nodes have already been selected, then the component continues at block 507, else the component continues at block 506. In block 506, the component invokes the calculate weights component passing the selected child node and then loops to block 504 to select the next child node. In block 507, the component invokes the calculate spread component to calculate the spread for the passed node based on the weights of the child nodes. In decision block 508, if the spread is greater than a spread threshold, then the passed node has sufficient weight and spread to represent the serving area and the component returns, else the component continues at block 509. In blocks 509-511, the component loops determining which child node has sufficient weight and spread to represent a serving area. In block 509, the component selects the next child node. In decision block 510, if all the child nodes have already been selected, then the component returns, else the component continues at block 511. In block 511, the component recursively invokes itself and then loops to block 509 to select the next child node.

Figure 6:
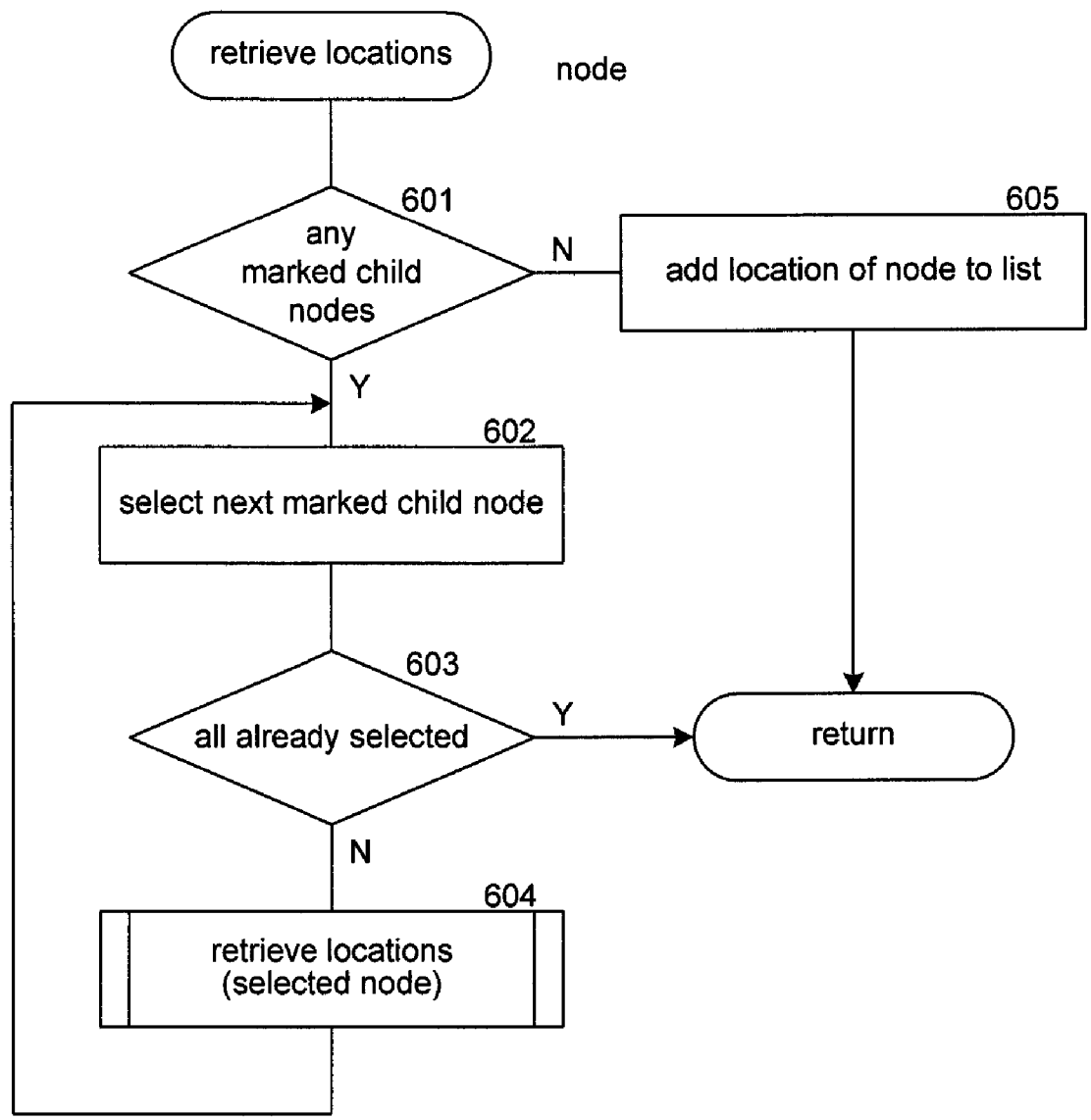
FIG. 6 is a flow diagram that illustrates the processing of the retrieve locations component of the location system in one embodiment.

FIG. 6 is a flow diagram that illustrates the processing of the retrieve locations component of the location system in one embodiment. The component retrieves the locations associated with the leaf nodes of those nodes that were marked by the traverse component. The component traverses the location hierarchy in a depth-first manner. In decision block 601, if the passed node has any marked child nodes, then the component continues at block 602, else the component continues at block 605. In blocks 602-604, the component loops recursively invoking itself for each marked child mode. In block 602, the component selects the next marked child node. In decision block 603, if all the marked child nodes have already been selected, then the component returns, else the component continues at block 604. In block 604, the component recursively invokes itself passing the selected node. The component then loops to block 602 to select the next marked child mode. In block 605, the component adds the location of the passed node to a serving area list when the passed node has no child nodes that are marked. The component then returns.

Figure 7:
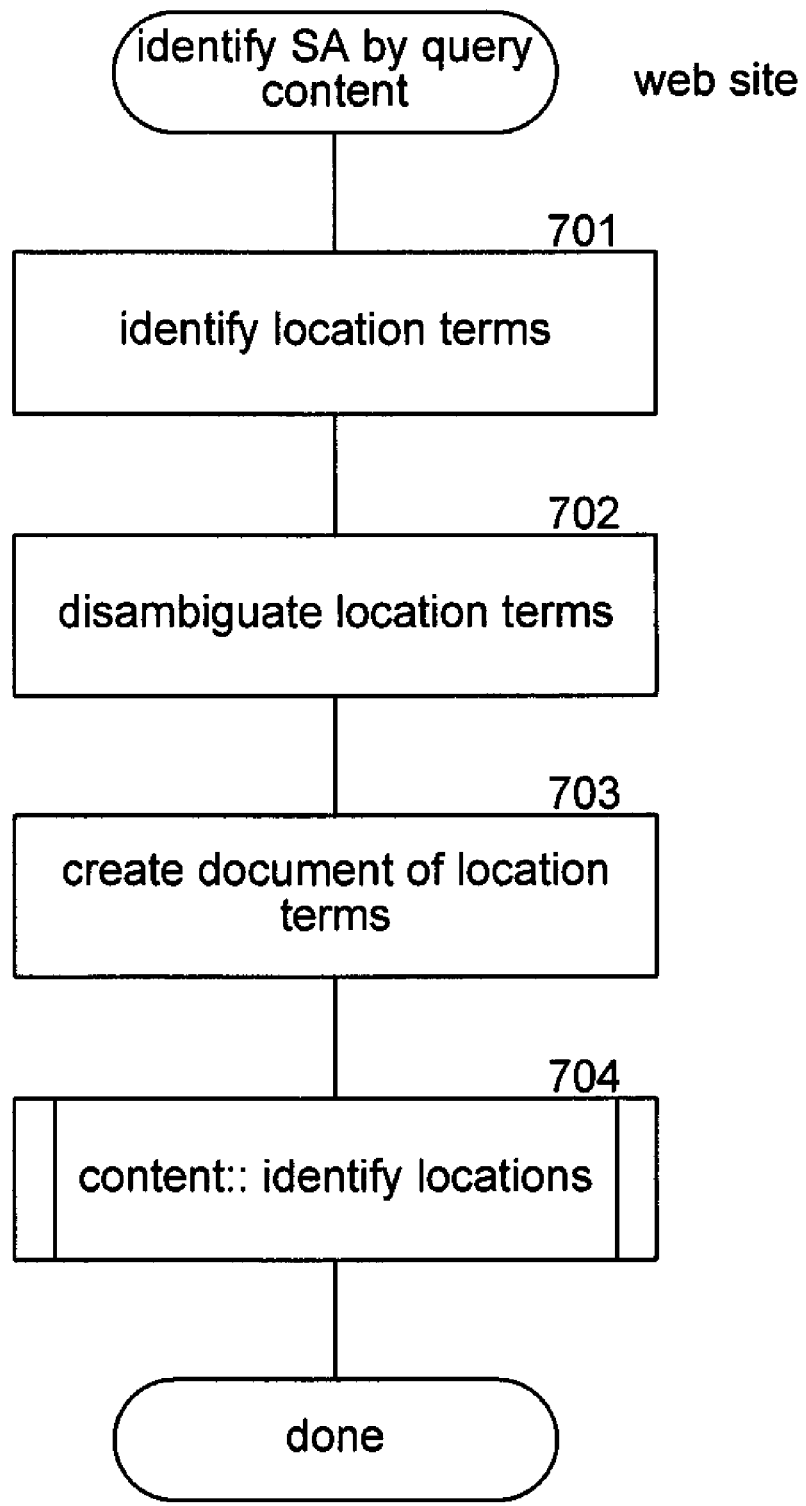
FIG. 7 is a flow diagram that illustrates the processing of the identify serving area by query content component of the location system in one embodiment.

FIG. 7 is a flow diagram that illustrates the processing of the identify serving area by query content component of the location system in one embodiment. The component is invoked to determine the serving area for a passed web site based on query content. In block 701, the component identifies the location terms within the queries. In block 702, the component disambiguates any ambiguous location terms. For example, the queries may include "ny," which ambiguously refers to New York City or New York State. The component determines that since the other queries refer to New York City, the ambiguous "ny" also likely refers to New York City. In block 703, the component creates a document of the identified location terms. In block 704, the component invokes the identify locations component to identify the content locations within the created document. The component then returns the identified content locations as the serving area for the passed web site.

Figure 8:
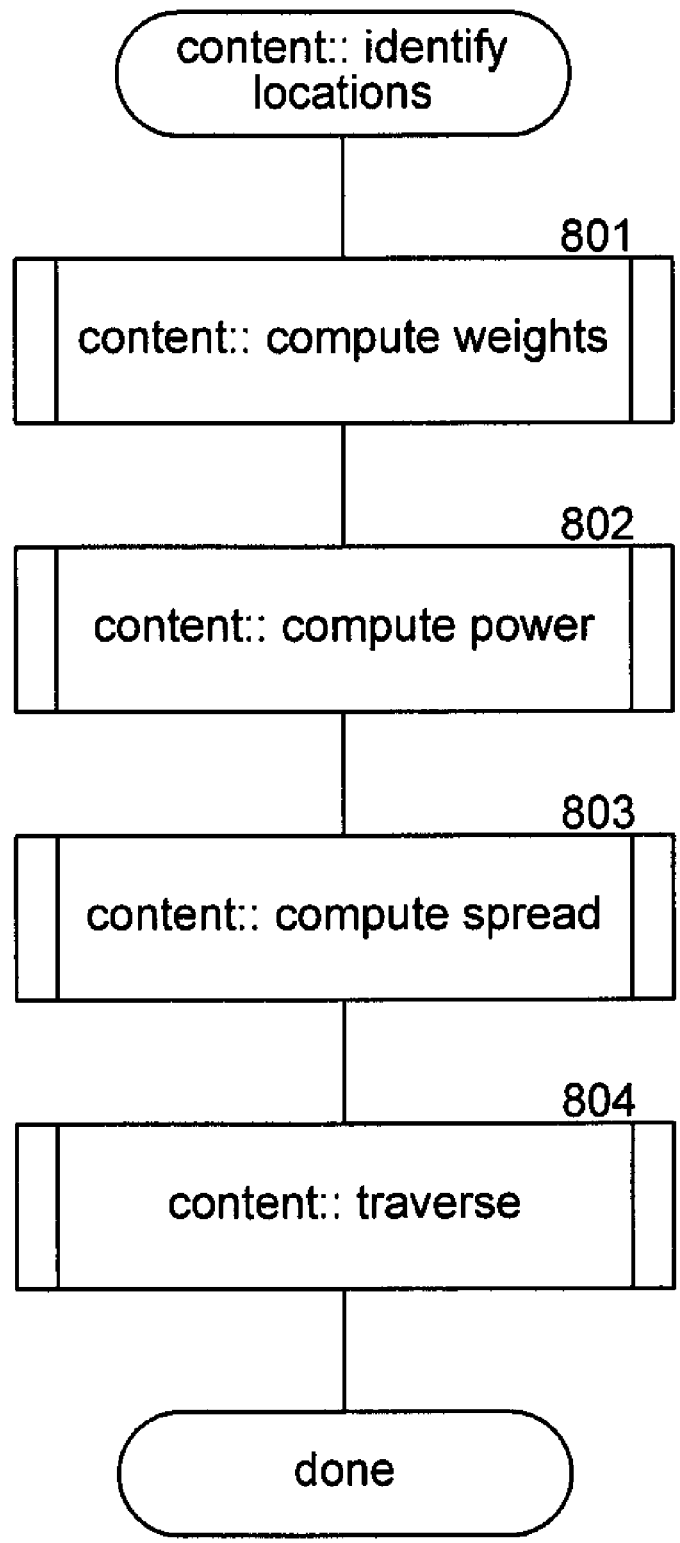
FIGS. 8-15 are flow diagrams that illustrate the processing of components of the content location components in one embodiment.

FIGS. 8-15 are flow diagrams that illustrate the processing of components of the content location components in one embodiment. FIG. 8 is a flow diagram that illustrates the processing of the identify locations component of the content location components in one embodiment. The component controls the overall process of identifying the content locations of a target web page. In block 801, the component invokes the compute weights component to compute the weights of the locations within the location hierarchy for the target web page. In block 802, the component invokes the compute power component to compute the power for the locations within the location hierarchy based on their weights. In block 803, the component invokes the compute spread component to compute the spread for the locations within the location hierarchy based on their power. In block 804, the component invokes the traverse component to traverse the location hierarchy to identify the content locations for the target web page. The component then completes.

Figure 9:
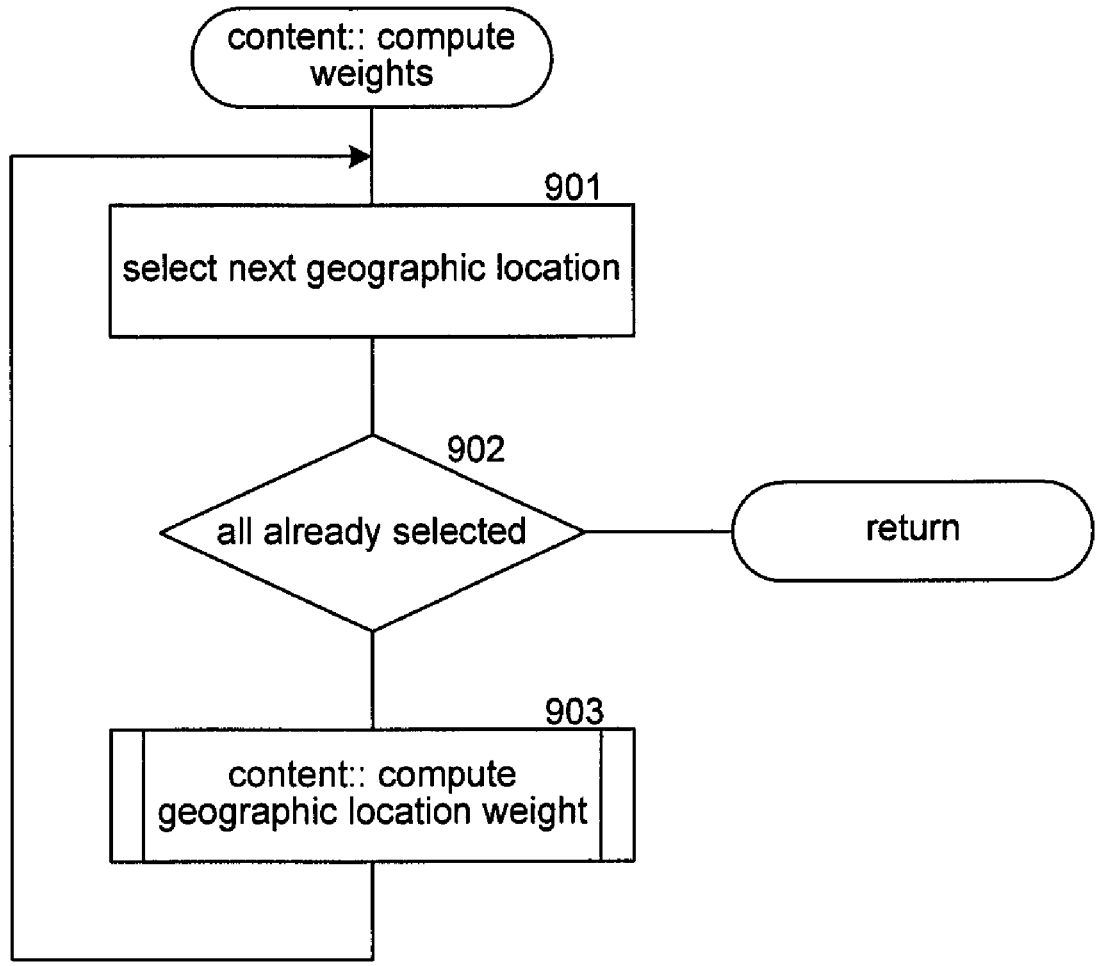

FIG. 9 is a block diagram that illustrates the processing of the compute weights component of the content location components in one embodiment. The component loops selecting the geographic locations of the target web page and computing their weights. In block 901, the component selects the next geographic location of the location hierarchy. In decision block 902, if all the geographic locations have already been selected, then the component returns, else the component continues at block 903. In block 903, the component invokes the compute geographic location weight component passing the selected geographic location to compute the weight of the geographic location for the target web page. The component then loops to block 901 to select the next geographic location. One skilled in the art will appreciate that the processing of the compute weights component may alternatively identify geographic locations of the target web page first and then compute the weights for the locations of the location hierarchy, rather than selecting each location of the location hierarchy first. In general, these flow diagrams illustrate the functional processing of the components to facilitate the description of the technology. One skilled in the art will appreciate that these components may be optimized in various ways.

Figure 10:
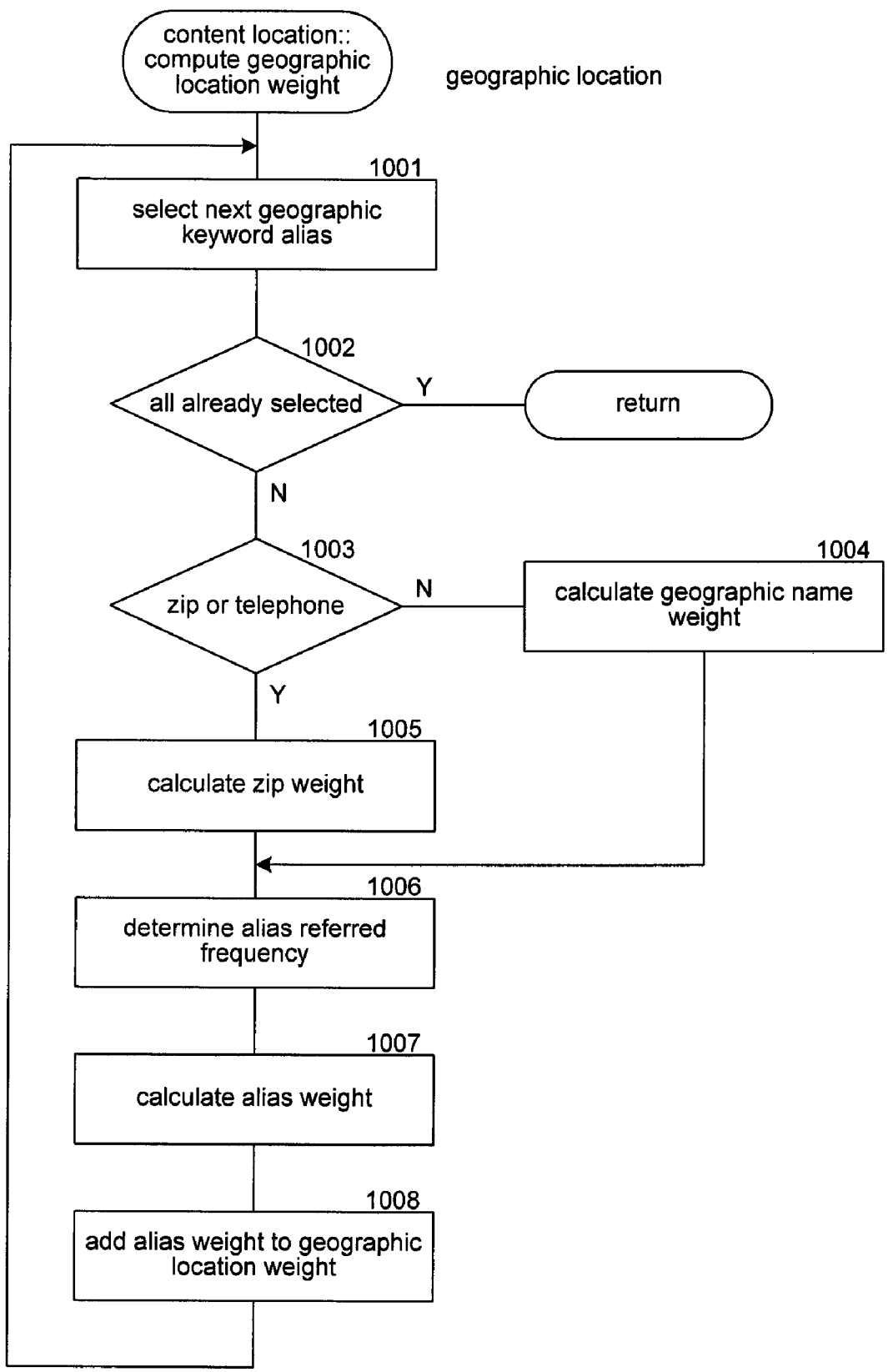

FIG. 10 is a flow diagram that illustrates the processing of the compute geographic location weight component of the content location components in one embodiment. The component is passed a geographic location and computes the weight of the geographic location for the target web page. The component loops summing the contributions of the aliases for the passed geographic location. In block 1001, the component selects the next alias of the passed location on the target web page. In decision block 1002, if all the aliases on the target web page have already been selected, then the component returns, else the component continues at block 1003. In decision block 1003, if the selected alias is a postal code or a telephone number, then the component continues at block 1005, else the component continues at block 1004. In block 1004, the component calculates the weight for the geographic name. In block 1005, the component calculates the weight for the postal code or telephone number. In block 1006, the component determines the number of times that the selected alias is referred to on the target web page. In block 1007, the component calculates the weight contribution of the selected alias. In block 1008, the component adds the weight contribution of the selected alias to the weight of the passed geographic location. The component then loops to block 1001 to select the next alias.

Figure 11:
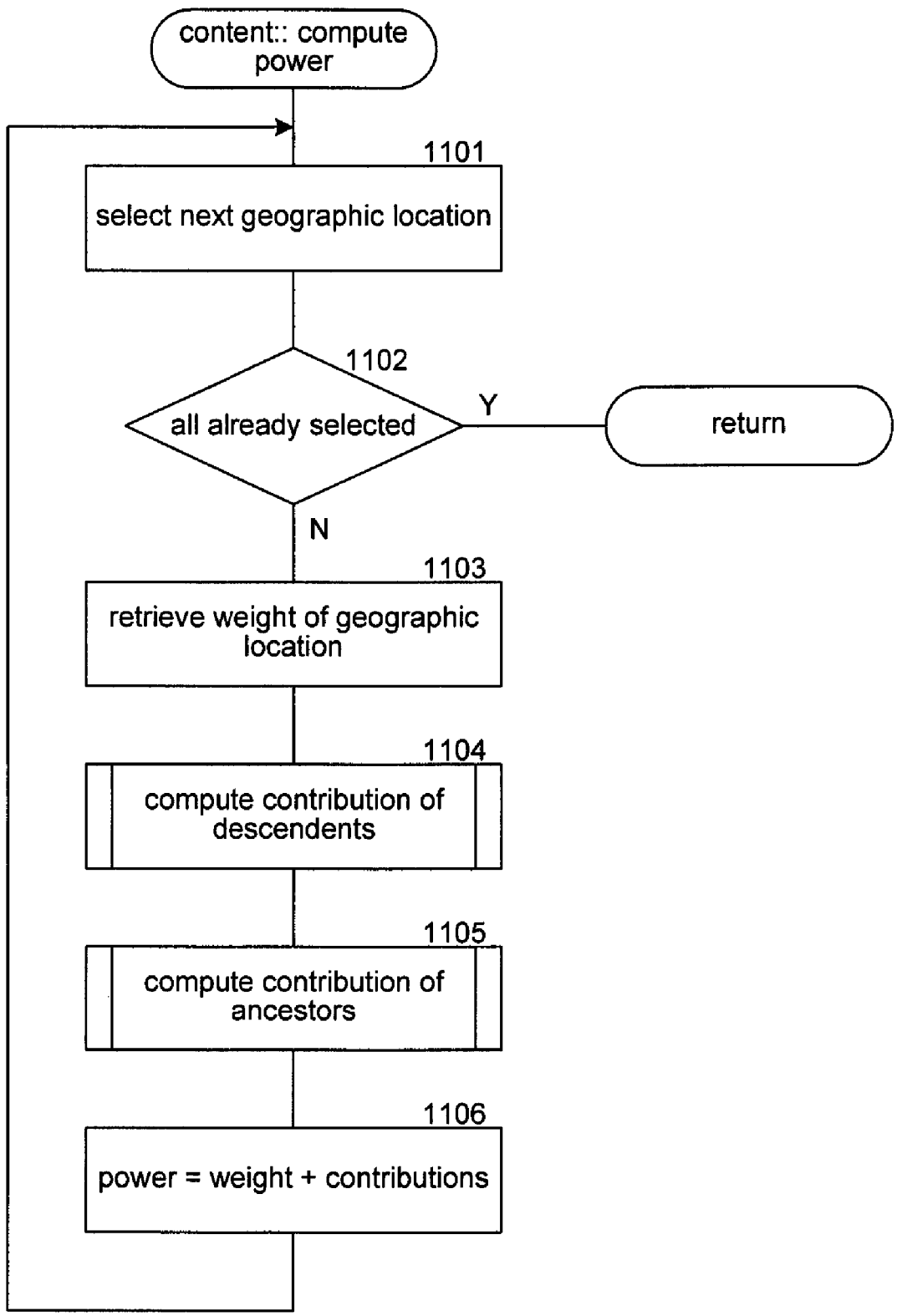

FIG. 11 is a flow diagram that illustrates the processing of the compute power component of the content location components in one embodiment. The component loops computing the power for each geographic location of the location hierarchy in a bottom-up manner. In block 1101, the component selects the next geographic location of the location hierarchy. In decision block 1102, if all the geographic locations have already been selected, then the component returns, else the component continues at block 1103. In block 1103, the component retrieves the weight of the selected geographic location. In block 1104, the component invokes the compute contribution of descendants component to compute the contribution of the descendants to the power. In block 1105, the component invokes the compute contribution of ancestors component to compute the contribution of the ancestors to the power. In block 1106, the component calculates the power as a combination of the retrieved weight and the contributions. The component then loops to block 1101 to select the next geographic location.

Figure 12:
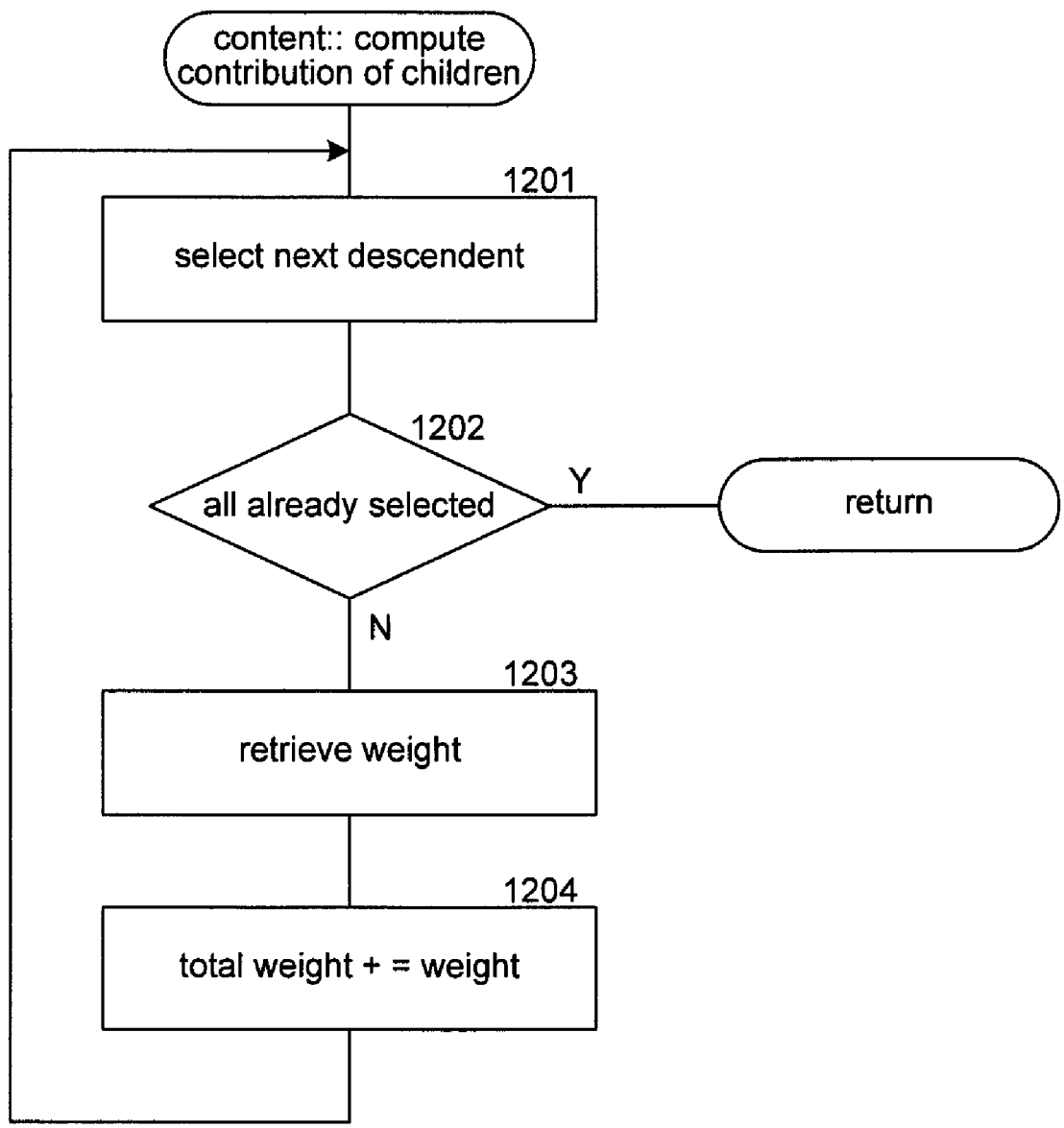

FIG. 12 is a flow diagram that illustrates the processing of the compute contribution of descendants component of the content location components in one embodiment. The component loops selecting the descendants of the passed geographic location and calculates the contribution of their weight to the power of the passed geographic location. In block 1201, the component selects the next descendant. In decision block 1202, if all the descendants have already been selected, then the component returns, else the component continues at block 1203. In block 1203, the component retrieves the weight for the selected descendant. In block 1204, the component adds the retrieved weight to the running total weight for the passed geographic location of the descendants. The component then loops to block 1201 to select the next descendant.

Figure 13:
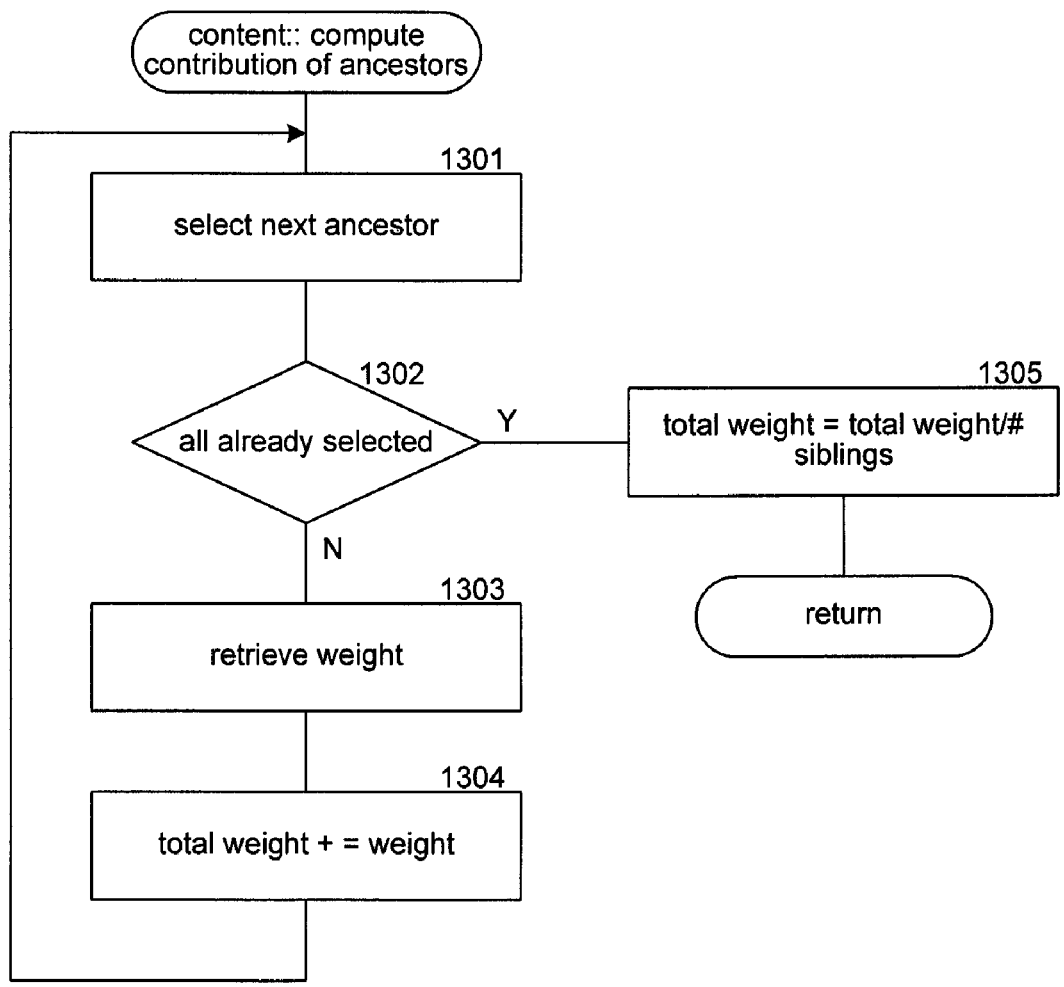

FIG. 13 is a flow diagram that illustrates the processing of the compute contribution of ancestors component of the content location components in one embodiment. The component loops selecting each ancestor location of the passed geographic location and aggregates the contribution of their weights to the power of the passed geographic location. In block 1301, the component selects the next ancestor location of the passed geographic location. In decision block 1302, if all the ancestor locations have already been selected, then the component continues at block 1305, else the component continues at block 1303. In block 1303, the component retrieves the weight of the selected ancestor location. In block 1304, the component adds the retrieved weight to a running total of the weights of the ancestor locations. The component then loops to block 1301 to select the next ancestor location. In block 1305, the component divides the total weight by the number of sibling locations of the passed geographic location and then returns.

Figure 14:
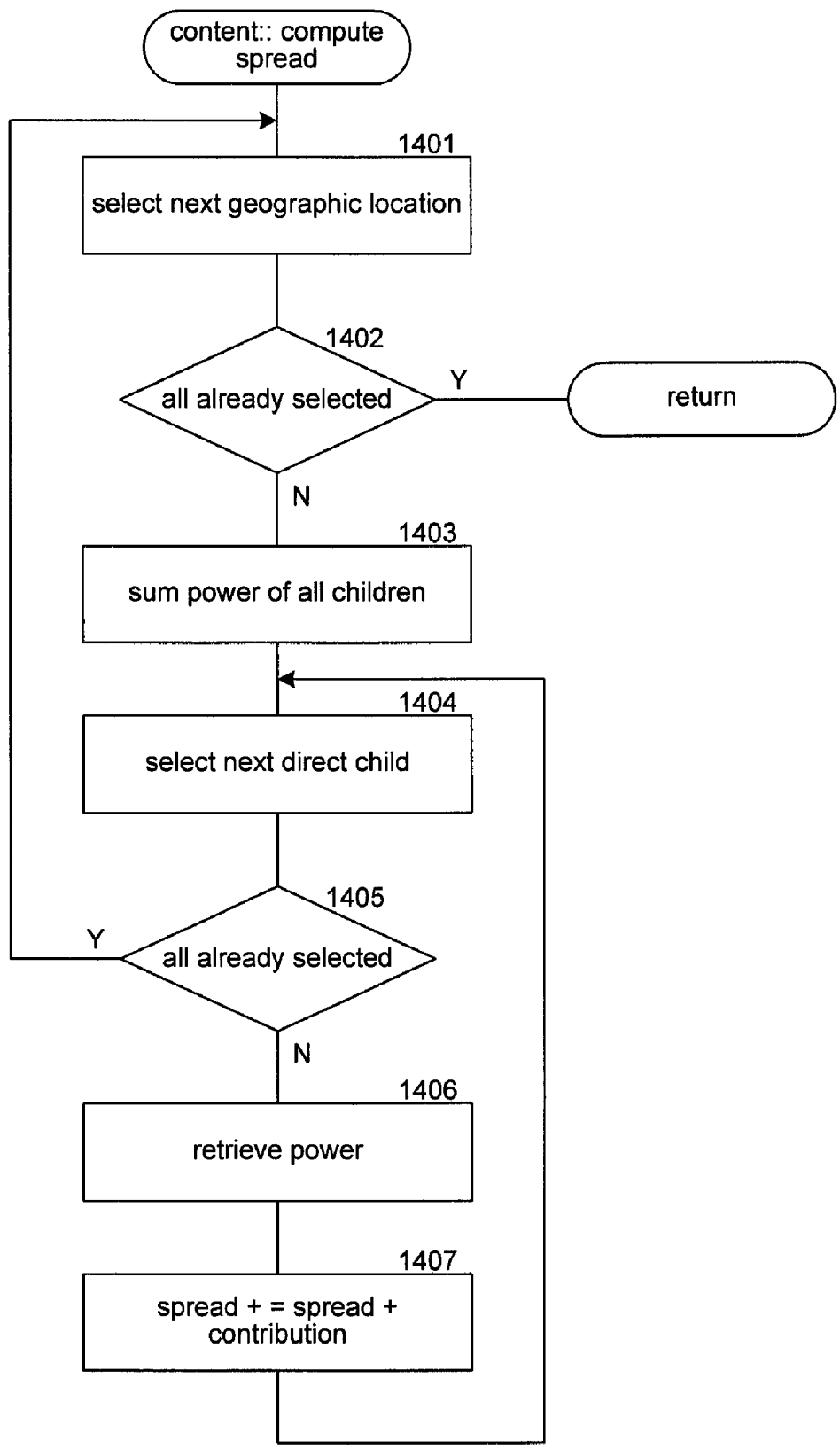

FIG. 14 is a flow diagram that illustrates the processing of the compute spread component of the content location components in one embodiment. The component loops calculating the spread for each geographic location of the location hierarchy. In block 1401, the component selects the next geographic location of the location hierarchy. In decision block 1402, if all the geographic locations have already been selected, then the component returns, else the component continues at block 1403. In block 1403, the component sums the power of all descendant locations of the selected geographic location. In blocks 1404-1407, the component loops calculating the contribution to the spread of each direct descendant location of the selected geographic location. In block 1404, the component selects the next direct descendant location of the selected geographic location. In decision block 1405, if all the direct descendant locations of the selected geographic location already have been selected, then the component loops to block 1401 to select the next geographic location, else the component continues at block 1406. In block 1406, the component retrieves the power for the selected direct descendant location. In block 1407, the component adds the retrieved power to the spread for the selected geographic location and then loops to block 1404 to select the next direct descendant location of the selected geographic location.

Figure 15:
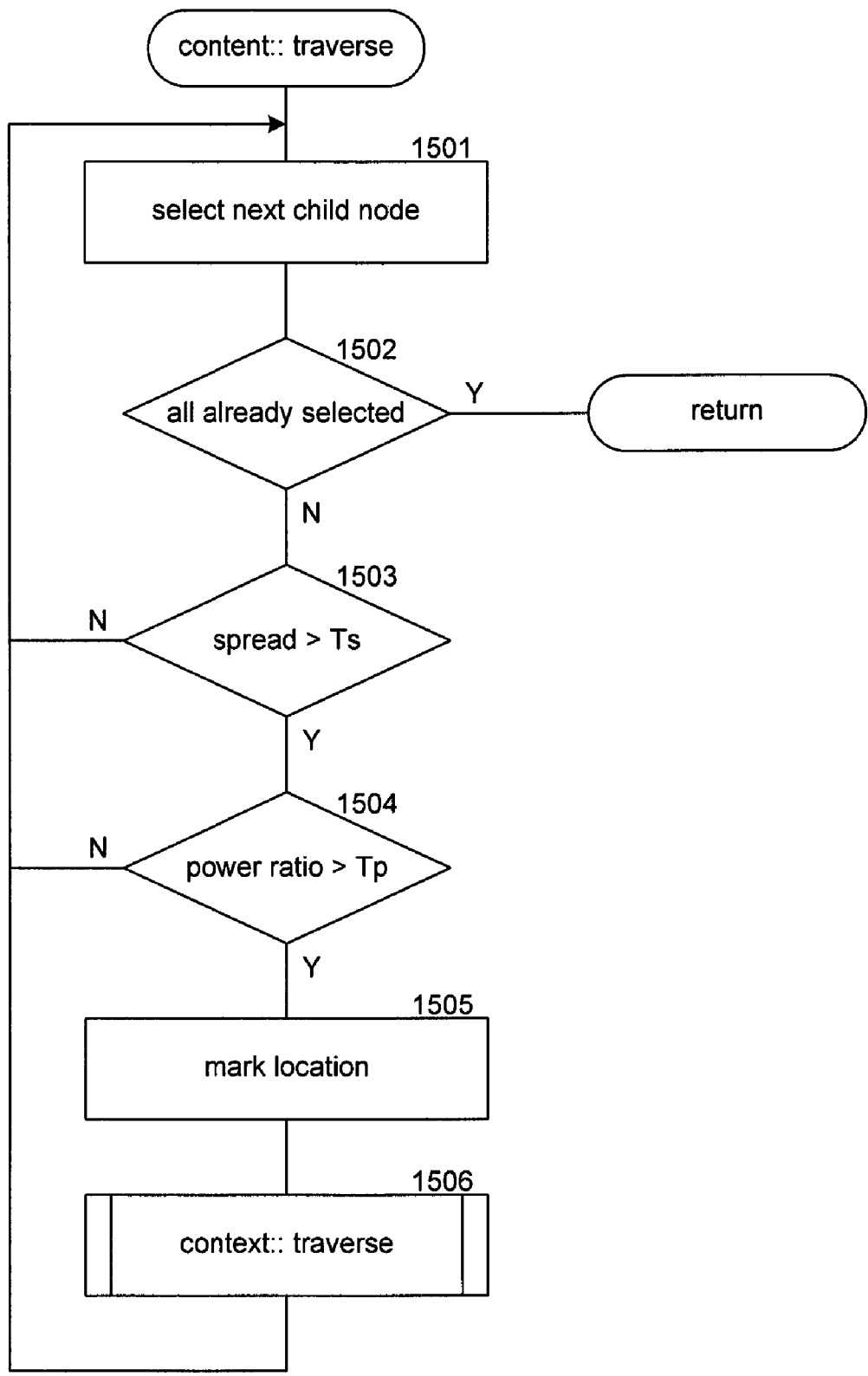

FIG. 15 is a flow diagram that illustrates the processing of the traverse component of the content location components in one embodiment. The component is illustrated as a recursive component that traverses the location hierarchy in a top-down manner. The component is passed the geographic location that is currently being visited. In blocks 1501-1506, the component loops selecting each direct descendant location of the passed location and either prunes the location or marks its location as being a content location and recursively invokes the traverse component. In block 1501, the component selects the next direct descendant location of the passed location. In decision block 1502, if all the direct descendant locations have already been selected, then the component returns, else the component continues at block 1503. In decision block 1503, if the spread of the selected direct descendant location is greater than a threshold spread, then the component continues at block 1504, else the component prunes the subtree with the selected direct descendant location as its root by looping to block 1501 to select the next direct descendant location of the passed geographic location. In decision block 1504, if the power ratio of the selected direct descendant location is greater than a threshold power ratio, then the component continues at block 1505, else the component prunes the subtree with the selected direct descendant location as its root by looping to block 1501 to select the next direct descendant location of the passed geographic location. In block 1505, the component marks the passed geographic location as being a content location. In block 1506, the component recursively invokes the traverse component passing the selected direct descendant location. The component then loops to block 1501 to select the next direct descendant location.

Figure 16:
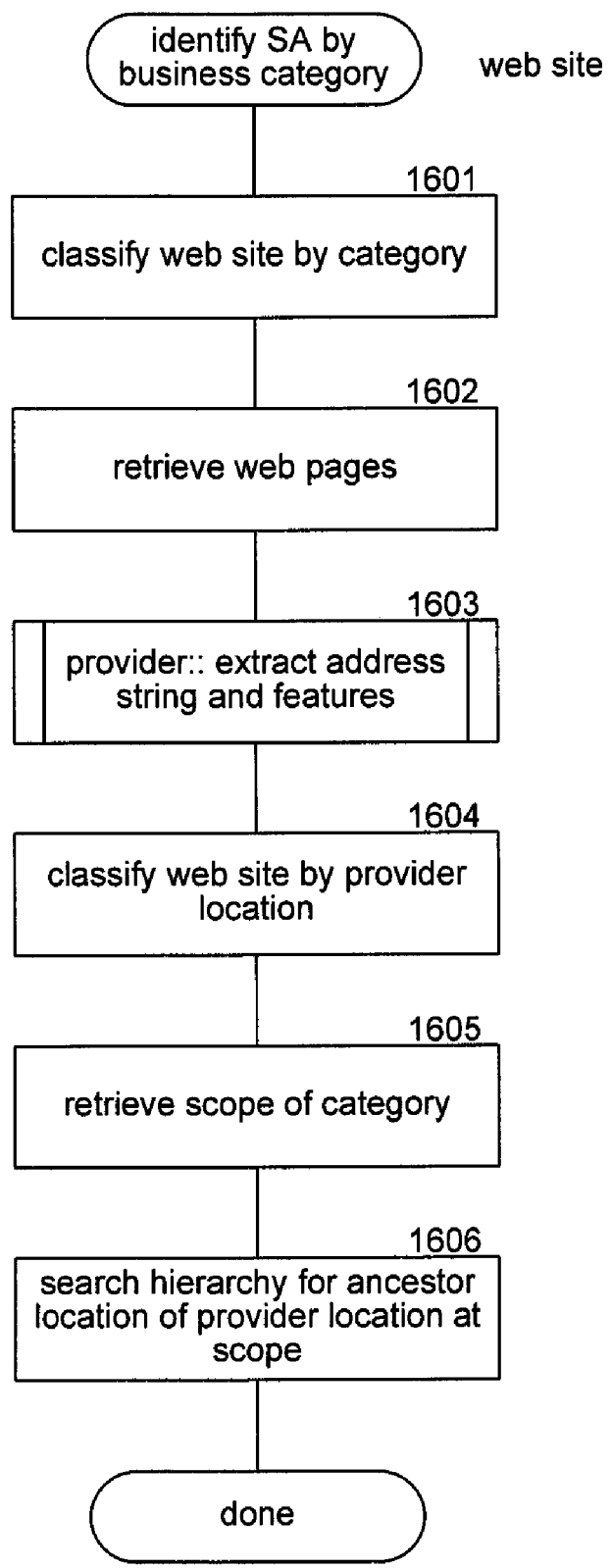
FIG. 16 is a flow diagram that illustrates the processing of the identify serving area by business category component of the location system in one embodiment.

FIG. 16 is a flow diagram that illustrates the processing of the identify serving area by business category component of the location system in one embodiment. The component identifies the serving area of the passed web site based on its business category and its provider location. In block 1601, the component classifies the web site by business category using a trained classifier. In block 1602, the component retrieves the web pages of the web site. In block 1603, the component invokes the extract address string and features component to generate features to be used to identify the provider location. In block 1604, the component invokes the classifier to identify the provider location of the web site. In block 1605, the component retrieves the scope of the business category of the web site. In block 1606, the component searches the location hierarchy for an ancestor location of the provider location that corresponds to the scope. If the provider location itself corresponds to the scope, then the component does not need to search. The component returns the searched-for location (or provider location) as the serving area for the web site.

Figure 17:
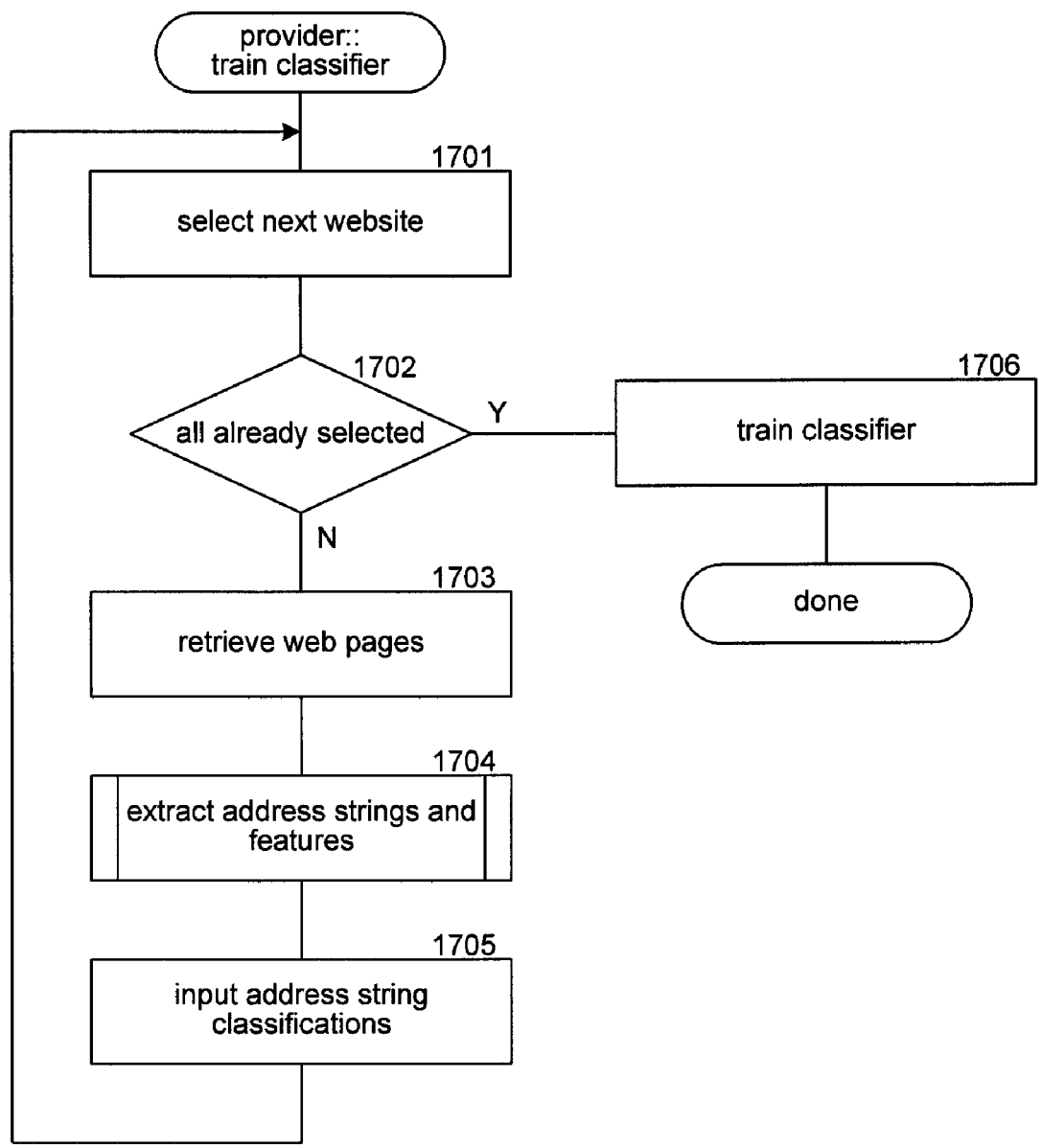
FIGS. 17-18 are flow diagrams that illustrate the processing of provider location components of the location system in one embodiment.
Figure 18:
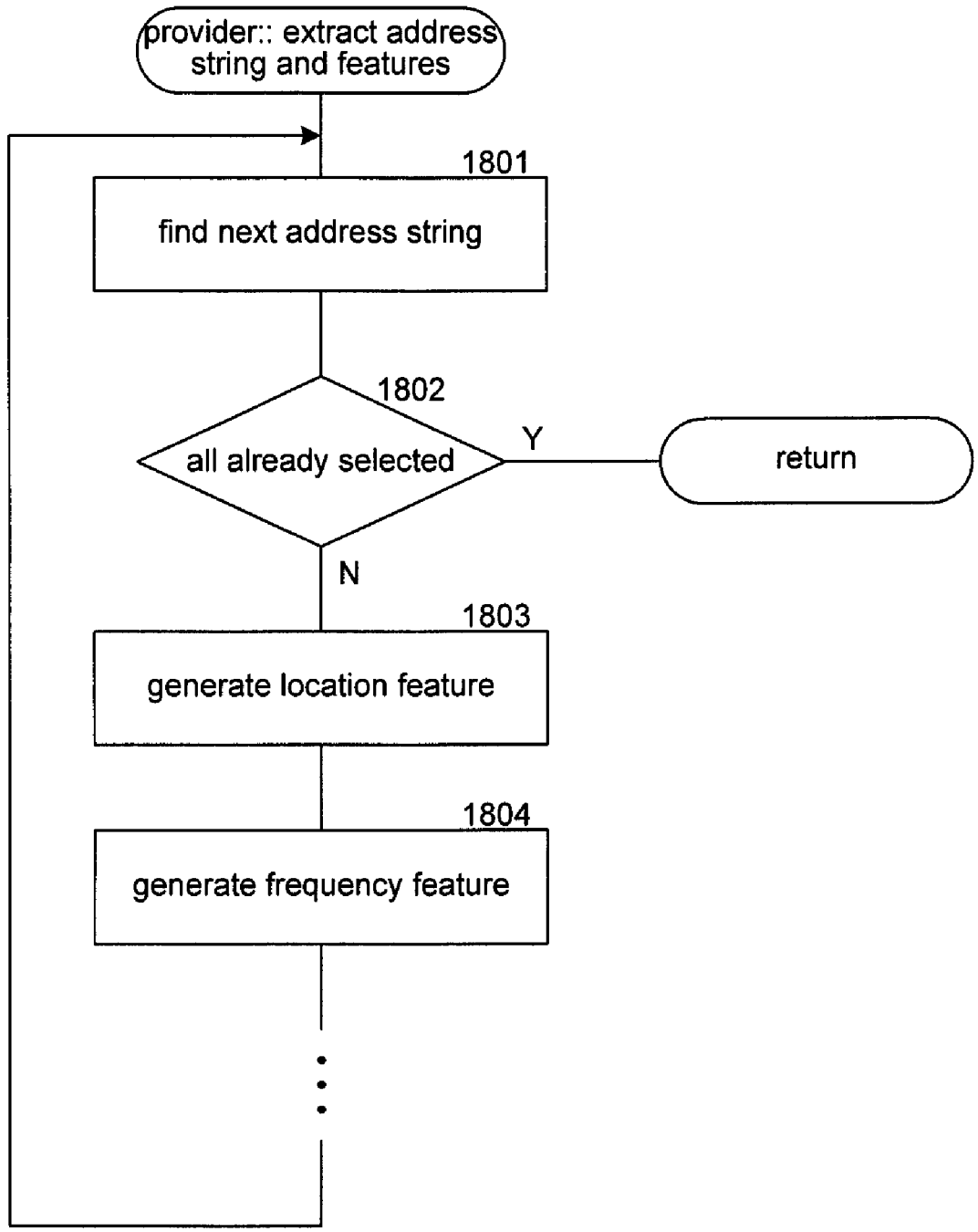

FIGS. 17-18 are flow diagrams that illustrate the processing of provider location components of the location system in one embodiment. FIG. 17 is a flow diagram that illustrates the processing of the train classifier component of the provider location components in one embodiment. The component loops extracting provider location strings and feature vectors for the web pages of the web sites of a web page store of training data. The component then trains the classifier. In block 1701, the component selects the next web site of the web page store. In decision block 1702, if all the web sites have already been selected, then the component continues at block 1706, else the component continues at block 1703. In block 1703, the component retrieves the web pages of the selected web site. In block 1704, the component extracts the location strings and feature vectors for the selected web pages by invoking the extract location strings and features component. In block 1705, the component inputs the classifications for the extracted location strings. For example, the component may prompt a user to indicate whether each location string represents a provider location. The component then loops to block 1701 to select the next web site of the web page store. In block 1706, the component trains the classifier using the features and classifications.

FIG. 18 is a flow diagram that illustrates the processing of the extract location string and feature component of the provider location components in one embodiment. The component loops searching for location strings within the web pages of the selected web site. In block 1801, the component finds the next location string within a web page. In decision block 1802, if all the location strings have already been found, then the component returns, else the component continues at block 1803. In blocks 1803-804, the component generates the feature vector corresponding to the found location string and then loops to block 1801 to select the next location string. As described above, the feature vector may include various features of the web pages from which the location string was extracted, such as location of the location string on a web page, hierarchy level of the web page within the web site, frequency of the location string within the web pages, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The location system may use a combination of the techniques described above to identify the serving area of a web resource. For example, the location system may normally identify the serving area for a web site by address or by query content. If, however, the location system does not have enough access information for a web site (e.g., a newly launched web site), the location system may use the business category technique to determine serving area. Also, there may be some business categories that are not well represented by any single scope. For example, a government business category may correspond to a city, state, or national scope. In such a case, the location system may determine the serving area based on content location, rather than relying on scope and provider location. The location system may be able to use addresses such as electronic mail addresses of users to identify the location of the user. If a web site maintains a database of users, the location system may be able to retrieve the location of the users based on addresses (e.g., city) stored in the database. In such a case, the location system may receive a user identifier (e.g., stored in a cookie) with an access request. Also, if the address-to-location mappings for a web site are not accurate (as often occurs with IP addresses), then the location system may identify serving area by query content, rather than by address. Accordingly, the invention is not limited except as by the appended claims.

We claim:

1. A computer system for determining a serving area of a web resource based on addresses of users, the serving area representing a geographic area that is a reach of the web resource, comprising:
    an access information store that includes, for each access of the web resource, the address of the user who accessed the web resource;
    an address mapping component that maps an address of the access information to a location within a hierarchy of locations; and
    an identification component that identifies a location of the hierarchy as a serving area of the web resource based on the number of accesses of the web resource by users within that location and based on the spread of the number of accesses of the web resource by users within locations that are hierarchically within the location.

2. The computer system of claim 1 wherein the address is an IP address.

3. The computer system of claim 1 wherein the access information is derived from a click-through log.

4. The computer system of claim 1 wherein the identification component calculates a weight for a location that is based on the ratio of the access rate of the location to the access rate of the parent location of the location.

5. The computer system of claim 4 wherein the weight is represented as follows:

$$\text{Weight}(w, l) = \frac{\text{Click}(w, l)/\text{Population}(l)}{\text{Click}(w, \text{Parent}(l))/\text{Population}(\text{Parent}(l))}$$

where Weight(w,l) represents the weight of location l for web resource w, Click(w,l) represents the number of click-throughs from location l to website w, Population(l) represents the population of location l, and Parent(l) represents the parent location of location l.

6. The computer system of claim 1 wherein the identification component calculates a spread for a location that indicates a distribution of the accesses of the location among its child locations.

7. The computer system of claim 6 wherein the spread is represented as follows:

$$\text{Spread}(w, l) = \frac{-\sum_{i=1}^{n} \frac{\text{Weight}(w, l_i)}{\sum_{j=1}^{n} \text{Weight}(w, l_j)} \times \log\left(\frac{\text{Weight}(w, l_i)}{\sum_{j=1}^{n} \text{Weight}(w, l_j)}\right)}{\log n}$$

where Spread(w,l) represents the spread of location l for web resource w, Weight(w,l) represents the weight of location l for web resource w, $l_x$ represents a child location of location l, and n represents the number of child locations of location l.

8. The computer system of claim 1 wherein the address is an IP address, the access information is derived from a click-through log, the identification component calculates a weight for a location that is based on the ratio of the access rate of the location to the access rate of the parent location of the location, and the identification component calculates a spread for a location that indicates a distribution of the accesses of the location among its child locations.

9. A method in a computing device for determining a serving area of a web resource based on addresses of users, the serving area representing a geographic area that is a reach of the web resource, the method comprising:
  providing an access information store with access information that includes, for accesses of the web resource, the addresses of the user who accessed the web resource;
  providing an address mapping that maps an address of the access information to a geographic location within a hierarchy of locations;
  identifying by the computing device a geographic location of the hierarchy based on the number of accesses of the web resource by users within that location and based on the spread of the number of accesses of the web resource by users within locations that are hierarchically within the location, the spread representing the distribution of accesses among child locations of a certain location as indicated by the hierarchy of locations; and
  designating the identified geographic location as the serving area of the web resource.

10. The method of claim 9 wherein the address is an IP address.

11. The method of claim 9 wherein the access information is derived from a click-through log.

12. The method of claim 9 including calculating a weight for a geographic location that is based on the ratio of the access rate of the geographic location to the access rate of the parent location of the geographic location.

13. The method of claim 12 wherein the weight is represented as follows:

$$\text{Weight}(w, l) = \frac{\text{Click}(w, l)/\text{Population}(l)}{\text{Click}(w, \text{Parent}(l))/\text{Population}(\text{Parent}(l))}$$

where Weight(w,l) represents the weight of geographic location l for web resource w, Click(w,l) represents the number of click-throughs from location l to website w, Population(l) represents the population of geographic location l, and Parent(l) represents the parent location of geographic location l.

14. The method of claim 9 including calculating a spread for a geographic location that indicates a distribution of the accesses of the geographic location among its child locations.

15. The method of claim 14 wherein the spread is represented as follows:

$$\text{Spread}(w, l) = \frac{-\sum_{i=1}^{n} \frac{\text{Weight}(w, l_i)}{\sum_{j=1}^{n} \text{Weight}(w, l_j)} \times \log\left(\frac{\text{Weight}(w, l_i)}{\sum_{j=1}^{n} \text{Weight}(w, l_j)}\right)}{\log n}$$

where Spread(w,l) represents the spread of geographic location l for web resource w, Weight(w,l) represents the weight of geographic location l for web resource w, $l_x$ represents a child location of geographic location l, and n represents the number of child locations of geographic location l.

16. The method of claim 9 wherein the address is an IP address, the access information is derived from a click-through log and including calculating a weight for a geographic location that is based on the ratio of the access rate of the geographic location to the access rate of the parent location of the geographic location, and calculating a spread for a geographic location that indicates a distribution of the accesses of the geographic location among its child locations.

17. A computer-readable storage medium for controlling a computing device to determine a serving area of a web resource based on IP addresses of users, the serving area representing the geographic area that is a reach of the web resource, by a method comprising:
  providing an access information store with access information that includes, for each access of the web resource, the IP address of the user who accessed the web resource, the IP addresses being derived from a click-through log indicating accesses to the web resource;
  providing an IP mapping that maps IP addresses to geographic locations within a hierarchy of locations;
  determining the geographic locations of the IP addresses associated with the accesses to the web resource using the provided IP mapping;
  identifying a geographic location of the hierarchy based on the ratio of the access rate of the determined geographic locations to the access rate of parent locations of the determined geographic locations and based on the spread of the number of accesses of the web resource by users within the geographic locations that are hierarchically within the determined geographic location, the spread representing the distribution of accesses among child locations in a certain location as indicated by the hierarchy of locations; and
  designating the identified geographic location as the serving area of the web resource.

18. The computer-readable storage medium of claim 17 wherein the weight is represented as follows:

$$\text{Weight}(w, l) = \frac{\text{Click}(w, l)/\text{Population}(l)}{\text{Click}(w, \text{Parent}(l))/\text{Population}(\text{Parent}(l))}$$

where Weight(w,l) represents the weight of geographic location l for web resource w, Click(w,l) represents the number of click-throughs from location l to website w, Population(l) represents the population of geographic location l, and Parent(l) represents the parent location of geographic location l.

19. The computer-readable storage medium of claim 17 wherein the spread is represented as follows:

$$\text{Spread}(w, l) = \frac{-\sum_{i=1}^{n} \frac{\text{Weight}(w, l_i)}{\sum_{j=1}^{n} \text{Weight}(w, l_j)} \times \log\left(\frac{\text{Weight}(w, l_i)}{\sum_{j=1}^{n} \text{Weight}(w, l_j)}\right)}{\log n}$$

where Spread(w,l) represents the spread of geographic location l for web resource w, Weight(w,l) represents the weight of geographic location l for web resource w, $l_x$ represents a child location of geographic location l, and n represents the number of child locations of geographic location l.

* * * * *

UNITED STATES PATENT AND TRADEMARK OFFICE
CERTIFICATE OF CORRECTION

PATENT NO. : 7,606,875 B2 Page 1 of 1
APPLICATION NO. : 11/277704
DATED : October 20, 2009
INVENTOR(S) : Xie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Twelfth Day of October, 2010

David J. Kappos
*Director of the United States Patent and Trademark Office*